US012133046B2

(12) United States Patent
Lee et al.

(10) Patent No.: US 12,133,046 B2
(45) Date of Patent: Oct. 29, 2024

(54) SPEAKER MODULE AND ELECTRONIC DEVICE INCLUDING THE SAME

(71) Applicant: Samsung Electronics Co., Ltd., Suwon-si (KR)

(72) Inventors: Hunki Lee, Suwon-si (KR); Joonrae Cho, Suwon-si (KR); Kiwon Kim, Suwon-si (KR); Myeungseon Kim, Suwon-si (KR); Choonghyo Park, Suwon-si (KR); Seongkwan Yang, Suwon-si (KR); Myungcheol Lee, Suwon-si (KR); Byounghee Lee, Suwon-si (KR); Woojin Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 99 days.

(21) Appl. No.: 17/842,107

(22) Filed: Jun. 16, 2022

(65) Prior Publication Data

US 2022/0394374 A1 Dec. 8, 2022

Related U.S. Application Data

(63) Continuation of application No. PCT/KR2022/008008, filed on Jun. 7, 2022.

(30) Foreign Application Priority Data

Jun. 7, 2021 (KR) ........................ 10-2021-0073342

(51) Int. Cl.
*H04R 1/28* (2006.01)
*H04R 1/02* (2006.01)

(52) U.S. Cl.
CPC ............. *H04R 1/288* (2013.01); *H04R 1/023* (2013.01); *H04R 1/025* (2013.01); *H04R 1/028* (2013.01);
(Continued)

(58) Field of Classification Search
CPC ........ H04R 1/288; H04R 1/023; H04R 1/025; H04R 1/028; H04R 1/2826;
(Continued)

(56) References Cited

U.S. PATENT DOCUMENTS 9,712,913 B2 * 7/2017 Lembacher .......... H04R 1/2803
10,609,471 B2 3/2020 Cao
(Continued)

FOREIGN PATENT DOCUMENTS

EP 1786235 A1 5/2007
KR 10-1468902 B1 11/2014
(Continued)

OTHER PUBLICATIONS

International Search Report dated Sep. 13, 2022, issued in an International Application No. PCT /KR2022/008008.
(Continued)

*Primary Examiner* — Oyesola C Ojo
(74) *Attorney, Agent, or Firm* — Jefferson IP Law, LLP

(57) ABSTRACT

An electronic device is provided. The electronic device includes a speaker module. The speaker module includes an enclosure including a first housing and a second housing and a speaker driver included in the first housing. The second housing includes an adsorption cavity forming a back volume of the speaker driver, a variable structure included in at least a part of the second housing, at least one vent hole for ventilation between the adsorption cavity and an external environment, and a housing cover fixed to the variable structure. The adsorption cavity is filled with an adsorptive filler.

18 Claims, 21 Drawing Sheets

(52) U.S. Cl.
CPC ........ *H04R 1/2826* (2013.01); *H04R 2499/11* (2013.01)

(58) Field of Classification Search
CPC ........ H04R 2499/11; H04R 1/02; H04R 1/10; H04R 1/28; H04R 1/2811; H04R 1/1058; H04R 1/2873; H04R 1/2888; H04R 2460/01; H04R 2460/11
See application file for complete search history.

(56) References Cited

U.S. PATENT DOCUMENTS 11,026,018 B2 6/2021 Wilk et al.
11,622,190 B2 4/2023 Cho et al.
11,671,745 B2 * 6/2023 Wilk .................... H04R 1/1083 381/345
2007/0127760 A1 * 6/2007 Saiki .................... H04R 1/2803 381/345
2007/0286449 A1 12/2007 Matsumura et al.
2013/0308812 A1 * 11/2013 Shen ...................... H04R 1/288 381/346
2016/0345090 A1 * 11/2016 Wilk ...................... B01D 53/04
2017/0041703 A1 * 2/2017 Herold ................... H04R 1/028
2017/0041704 A1 * 2/2017 Herold ................. H04R 1/2819
2017/0064438 A1 * 3/2017 Wilk .................... H04R 1/2811
2017/0099548 A1 * 4/2017 Schoeffmann ......... H04R 1/288
2017/0195781 A1 * 7/2017 Kang ................. B01J 20/28004
2018/0020273 A1 * 1/2018 Li ......................... H04R 1/2853
2018/0124502 A1 * 5/2018 Liu ...................... G10K 11/162
2019/0158951 A1 * 5/2019 Cao ........................ H04R 9/025
2019/0335258 A1 10/2019 Vaturi
2020/0043991 A1 2/2020 Noh et al.
2020/0092636 A1 * 3/2020 Sauer ........................ H04R 1/02
2020/0152165 A1 * 5/2020 Gavryushin ......... G10K 11/002
2020/0213713 A1 * 7/2020 Wang ................... H04R 1/2803
2021/0037312 A1 2/2021 Cho et al.
2021/0037313 A1 2/2021 Cho et al.
2021/0144465 A1 * 5/2021 Sauer ..................... H04R 1/288
2022/0337939 A1 * 10/2022 Liu ........................ H04R 1/025
2022/0394374 A1 * 12/2022 Lee ........................ H04R 1/288

FOREIGN PATENT DOCUMENTS

KR 10-2017-0081136 A 7/2017
KR 10-2020-0016417 A 2/2020
KR 10-2021-0015556 A 2/2021
KR 10-2021-0015557 A 2/2021
WO 2020/125703 A1 6/2020

OTHER PUBLICATIONS

Extended European Search Report dated Aug. 29, 2024, issued in European Application No. 22820525.8.

* cited by examiner

SPEAKER MODULE AND ELECTRONIC DEVICE INCLUDING THE SAME

CROSS-REFERENCE TO RELATED APPLICATION(S)

This application is a continuation application, claiming priority under § 365(c), of an International application No. PCT/KR2022/008008, filed on Jun. 7, 2022, which is based on and claims the benefit of a Korean patent application number 10-2021-0073342, filed on Jun. 7, 2021, in the Korean Intellectual Property Office, the disclosure of which is incorporated by reference herein in its entirety.

TECHNICAL FIELD

The disclosure relates to a speaker module and an electronic device including the same.

BACKGROUND ART

An electronic device, such as a smart phone, a tablet personal computer (PC), or a personal digital assistant (PDA), may include a speaker module for outputting a sound.

As the electronic device becomes slim, the demand for small-sized speaker modules is increasing. The speaker module may form a virtual back volume by using an adsorptive filler in order to improve acoustic performance. When the speaker module is driven, the adsorptive filler forms the virtual back volume by adsorbing gas or sucking a sound. Accordingly, there is an effect in that low band performance of the speaker module can be improved by expanding a back surface space of the speaker module.

Such an adsorptive filler may be a granular form. As the filling ratio of the adsorptive filler within the back surface space is increased, acoustic performance of the speaker module may be improved.

The above information is presented as background information only to assist with an understanding of the disclosure. No determination has been made, and no assertion is made, as to whether any of the above might be applicable as prior art with regard to the disclosure.

DISCLOSURE

Technical Problem

When the back surface space or an adsorption cavity is filled with the adsorptive filler in order to improve acoustic performance of the speaker module, there is a problem in that a charging time increases geometrically. Furthermore, if the back surface space or adsorption cavity of the speaker module is not sufficiently filled with the adsorptive filler, there is a problem in that noise occurs because the adsorptive filler collides against the housing of the speaker module.

Aspects of the disclosure are to address at least the above-mentioned problems and/or disadvantages and to provide at least the advantages described below. Accordingly, an aspect of the disclosure is to provide a speaker module and an electronic device including the same are intended to improve the filling ratio of an adsorptive filler within the back surface space or adsorption cavity of the speaker module.

Another aspect of the disclosure is to provide a speaker module and an electronic device including the same are intended to reduce the time that is taken for an adsorptive filler to be filled into the back surface space or adsorption cavity of the speaker module.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a speaker module. The speaker module includes an enclosure including a first housing and a second housing and a speaker driver included in the first housing. The second housing includes an adsorption cavity forming a back volume of the speaker driver, a variable structure included in at least a part of the second housing, at least one vent hole for ventilation between the adsorption cavity and an external environment, and a housing cover fixed to the variable structure. The adsorption cavity is filled with an adsorptive filler.

Advantageous Effects

The speaker module and the electronic device including the same according to various embodiments of the disclosure can improve low band acoustic performance of the speaker module by improving the filling ratio of the adsorptive filler within the back surface space or adsorption cavity of the speaker module.

The speaker module and the electronic device including the same according to various embodiments of the disclosure can reduce noise occurring because the adsorptive filler collides against the housing of the speaker module by improving the filling ratio of the adsorptive filler within the back surface space or adsorption cavity of the speaker module.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

Mode for Disclosure

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
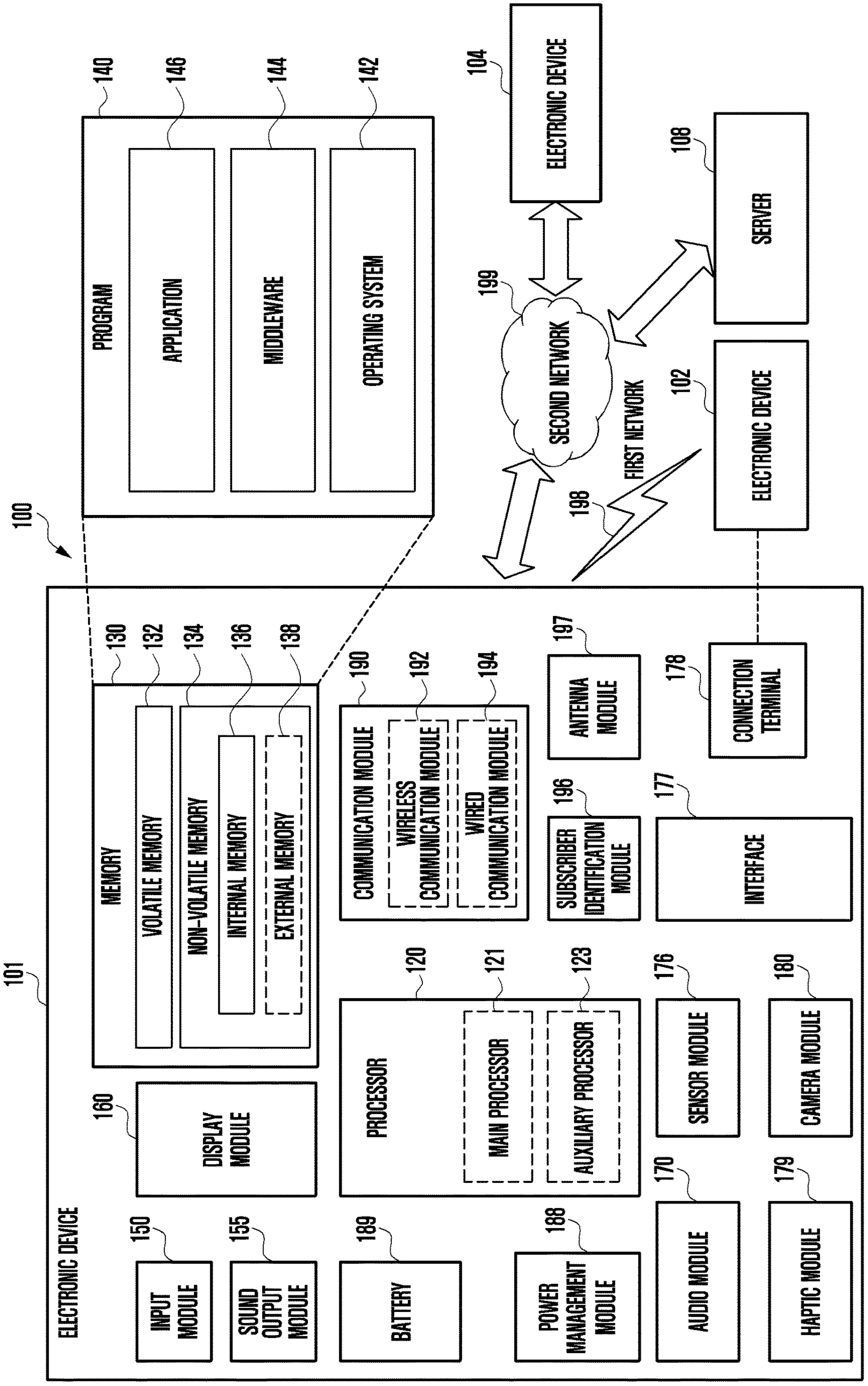
FIG. 1 is a block diagram of an electronic device within a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
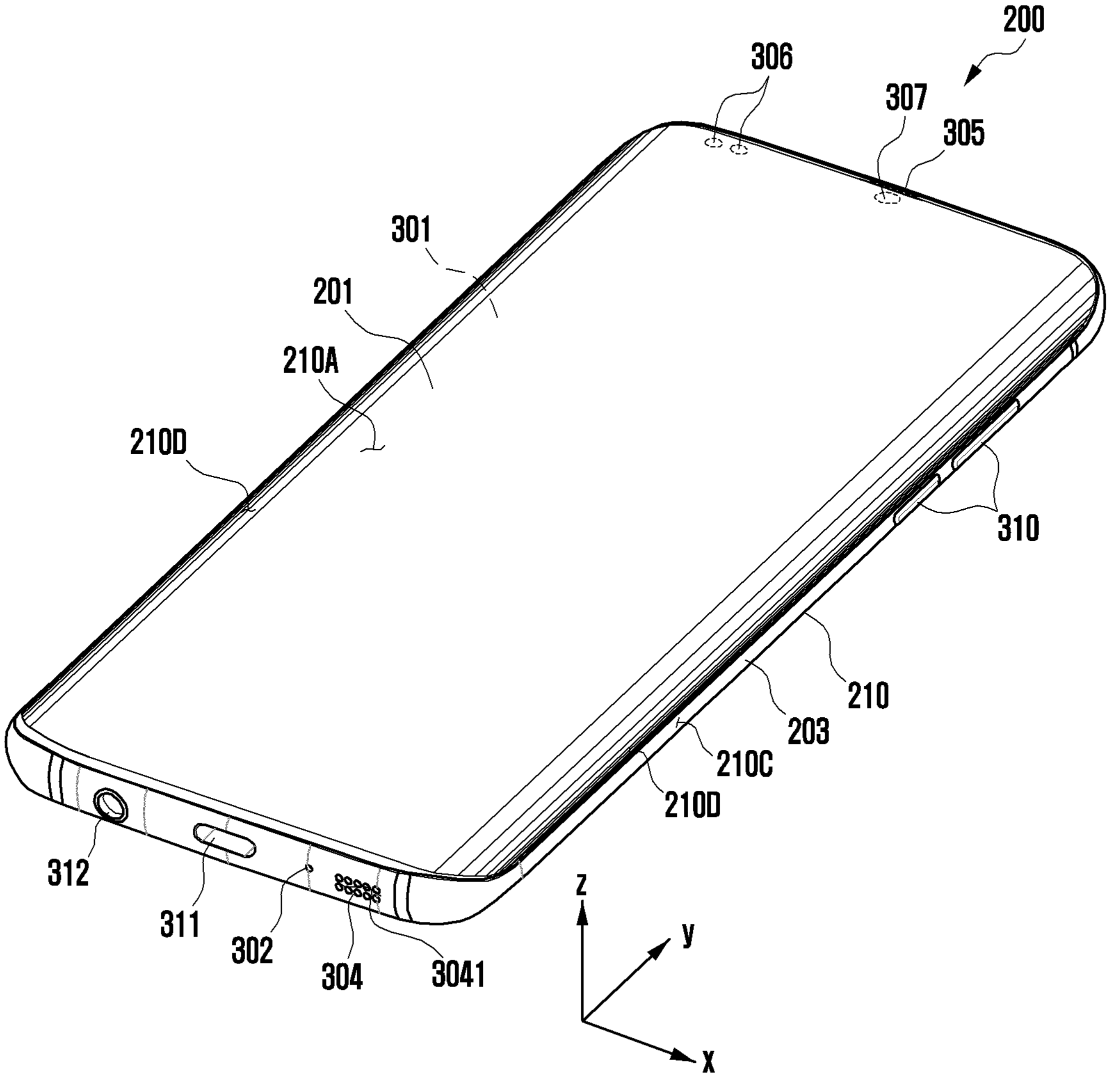
FIG. 2 is a perspective view of a front surface of an electronic device according to an embodiment of the disclosure.

FIG. 2 is a perspective view of a front surface of an electronic device 200 according to an embodiment of the disclosure.

Figure 3:
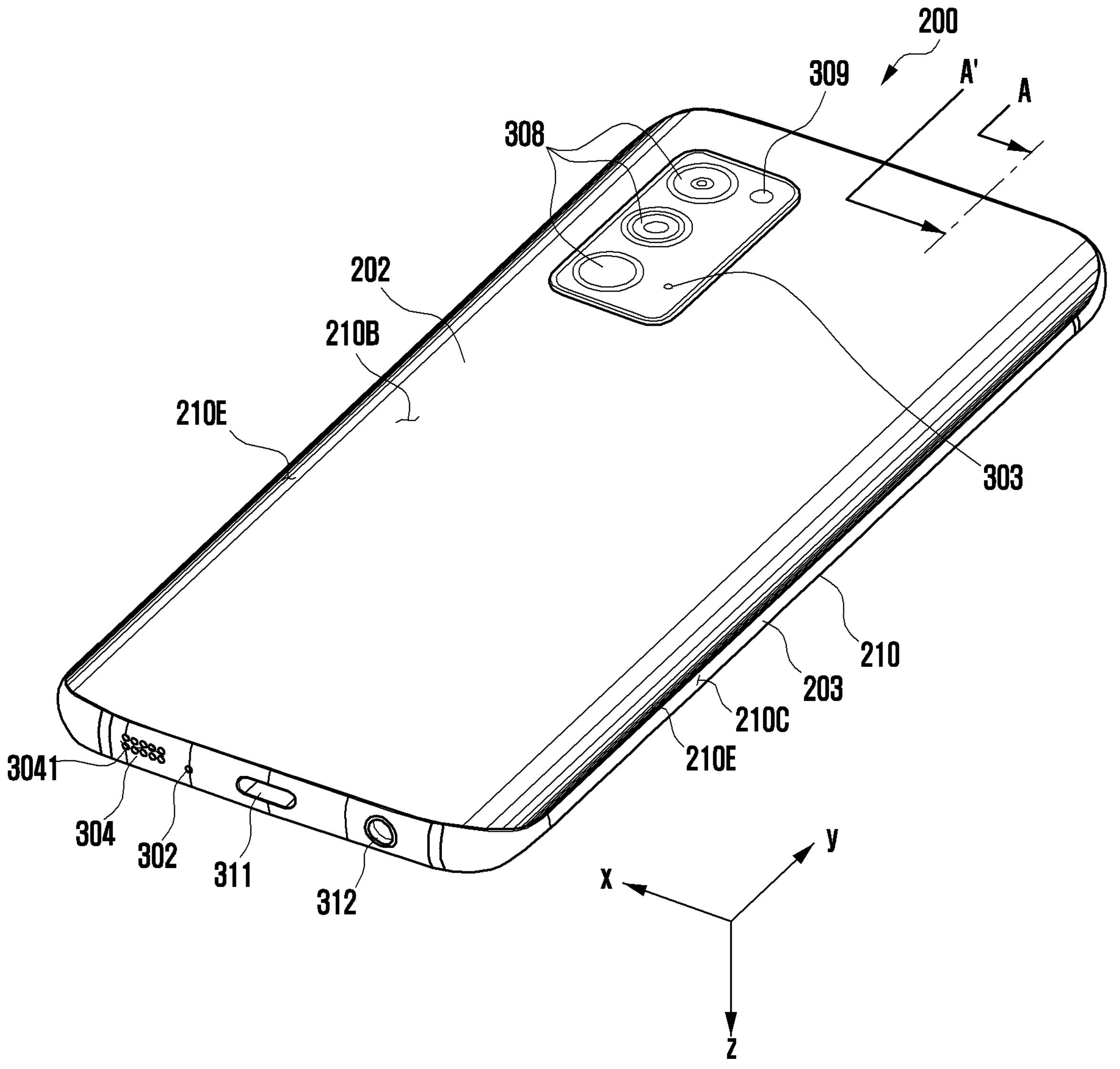
FIG. 3 is a perspective view of a back surface of the electronic device in FIG. 2 according to an embodiment of the disclosure.

FIG. 3 is a perspective view of a back surface of the electronic device 200 in FIG. 2 according to an embodiment of the disclosure.

Referring to FIGS. 2 and 3, in an embodiment, the electronic device 200 (e.g., the electronic device 101 in FIG. 1) may include a housing 210, including a first surface (or a front surface) 210A, a second surface (or a back surface) 210B, and a side surface 210C surrounding a space between the first surface 210A and the second surface 210B. In some embodiment, the housing 210 may denote a structure that forms at least some among the first surface 210A, the second surface 210B, and the side surface 210C. At least a part of the first surface 210A may be formed by a front surface plate (or a first plate) 201 (e.g., a glass plate or a polymer plate including various coating layers) that is substantially transparent. The second surface 210B may be formed by a back surface plate (or a second plate) 202 that is substantially opaque. The back surface plate 202 may be formed by coated or colored glass, ceramic, a polymer, metal (e.g., aluminum, stainless steel (STS), or magnesium), or a combination of at least two of the materials, for example. The side surface 210C may be formed by a side surface bezel structure (or a side surface member) 203 combined with the front surface plate 201 and the back surface plate 202. The side surface bezel structure 203 may include metal and/or a polymer. In some embodiment, the back surface plate 202 and the side surface bezel structure 203 may be formed in an integrated manner, and may include the same material (e.g., a metal material such as aluminum).

In an embodiment, the front surface plate 201 may include two first areas 210D that are bent from the first surface 210A to the back surface plate 202 and seamlessly extended. The first areas 210D may be formed in a way to neighbor long edges on both sides of the front surface plate 201, respectively. The back surface plate 202 may include two second areas 210E that are bent from the second surface 210B to the front surface plate 201 and seamlessly extended. The second areas 210E may be formed in a way to neighbor long edges on both sides of the back surface plate 202, respectively. The side surface 210C may have a first thickness (or width) (e.g., the height in a z axis direction) on the side in which the first areas 210D and the second areas 210E are not disposed, and may have a second thickness smaller than the first thickness on the side in which the first areas 210D and the second areas 210E are disposed. In some embodiment, the front surface plate 201 may be implemented by including one of the first areas 210D or may be implemented without the first areas 210D that is bent. In some embodiment, the back surface plate 202 may be implemented by including one of the second areas 210E or may be implemented without the second areas 210E that is bent.

According to an embodiment, the electronic device 200 may include at least one of a display 301, a first audio module 302, a second audio module 303, a third audio module 304, a fourth audio module 305, a sensor module 306, a first camera module 307, a plurality of second camera modules 308, a light-emitting module 309, an input module 310, a first connection terminal module 311, or a second connection terminal module 312. In some embodiment, the electronic device 200 may omit at least one of the components or may additionally include another component.

A display area (e.g., a screen display area or an active area) of the display 301 may be visually exposed through the front surface plate 201, for example. In an embodiment, the electronic device 200 may be implemented so that a display area viewed through the front surface plate 201 is maximized (e.g., a large screen or a full screen). For example, the display 301 may be implemented to have an outskirt generally having the same shape as an outskirt shape of the front surface plate 201. Furthermore, for example, an interval between the outskirt of the display 301 and the outskirt of the front surface plate 201 may be generally identically formed. In an embodiment, the display 301 may include a touch sensing circuit. In some embodiment, the display 301 may include a pressure sensor capable of measuring pressure of a touch. In some embodiment, the display 301 may be combined with a digitizer (e.g., an electromagnetic induction panel) that detects an electronic pen (e.g., a stylus pen) using a magnetic field method or may be disposed in a way to be adjacent to the digitizer.

The first audio module 302 may include a first microphone disposed within the electronic device 200 and a first microphone hole formed in the side surface 210C in accordance with the first microphone, for example. The second audio module 303 may include a second microphone (or a second microphone module) disposed within the electronic device 200 and a second microphone hole formed in the second surface 210B in accordance with the second microphone, for example. The location of the audio module relating to the microphone or the number thereof is not limited to the illustrated examples, and may be various. In some embodiment, the electronic device 200 may include a plurality of microphones that are used to detect a direction of a sound.

The third audio module 304 may include a first speaker (or a first speaker module) disposed within the electronic device 200 and a first speaker hole formed in the side surface 210C in accordance with the first speaker, for example. The fourth audio module 305 may include a second speaker (or a second speaker module) disposed within the electronic device 200 and a second speaker hole formed in the first surface 210A in accordance with the second speaker, for example. In an embodiment, the first speaker may include an outside speaker. In an embodiment, the second speaker may include a receiver for a call. The second speaker hole may be denoted as a receiver hole. The location of the third audio module 304 or the fourth audio module 305 or the number thereof is not limited to the illustrated examples, and may be various. In some embodiment, the microphone hole and the speaker hole may be implemented as one hole. In some embodiment, the third audio module 304 or the fourth audio module 305 may include a piezo speaker from which a speaker hole has been omitted.

The sensor module 306 may generate an electrical signal or a data value corresponding to an internal operating state of the electronic device 200 or an external environment state, for example. In an embodiment, the sensor module 306 may include an optical sensor disposed within the electronic device 200 in accordance with the first surface 210A. The optical sensor may include a proximity sensor or an illuminance sensor, for example. The optical sensor may be aligned with an opening formed in the display 301. External light may be introduced into the optical sensor through the front surface plate 201 and the opening of the display 301. In some embodiment, the optical sensor may be disposed under the display 301, and may perform a related function with a location of the optical sensor being not visually distinct (or exposed). For example, the optical sensor may be disposed on a back surface of the display 301 or below or beneath the display 301. In some embodiment, the optical sensor may be disposed in a way to be aligned with a recess formed in the back surface of the display 301. The optical sensor may be disposed in a way to be overlapped with at least a part of a screen or may perform a sensing function without being exposed to the outside. In this case, some area of the display 301 at least partially overlapped with the optical sensor may include a different pixel structure and/or wiring structure compared to another area. For example, some area of the display 301 at least partially overlapped with the optical sensor may have different pixel density compared to another area. In some embodiment, a plurality of pixels may not be disposed in some area of the display 301 at least partially overlapped with the optical sensor. In some embodiment, the electronic device 200 may include a bio sensor (e.g., a fingerprint sensor) disposed below or beneath the display 301. The bio sensor may be implemented in an optical way or ultrasonic way, and the location of the bio sensor or the number thereof may be various. The electronic device 200 may further include at least one of various other sensor modules, for example, a gesture sensor, a gyro sensor, an atmospheric sensor, a magnetic sensor, an acceleration sensor, a grip sensor, a color sensor, an infrared (IR) sensor, a temperature sensor, or a humidity sensor.

The first camera module 307 (e.g., a front surface camera module) may be disposed within the electronic device 200 in accordance with the first surface 210A, for example. The plurality of second camera modules 308 (e.g., back surface camera modules) may be disposed within the electronic device 200 in accordance with the second surface 210B, for example. The first camera module 307 and/or the plurality of second camera modules 308 may include one or a plurality of lenses, image sensors and/or image signal processors. The location of the first camera module or the second camera module or the number thereof is not limited to the illustrated examples, and may be various.

According to an embodiment, the display 301 may include an opening aligned with the first camera module 307. External light may reach the first camera module 307 through the front surface plate 201 and the opening of the display 301. In some embodiment, the opening of the display 301 may be formed in a notch form depending on a location of the first camera module 307. In some embodiment, the first camera module 307 may be disposed under the display 301, and may perform a related function (e.g., image photographing) with a location of the first camera module 307 being not visually distinct (or exposed). For example, the first camera module 307 may be disposed on a back surface of the display 301 or below or beneath the display 301, and may include a hidden display back surface camera (e.g., a under display camera (UDC)). In some embodiment, the first camera module 307 may be disposed by being aligned with a recess formed in the back surface of the display 301. The first camera module 307 may be disposed by being overlapped with at least a part of a screen, and may obtain an image of an outside subject without being visually exposed to the outside. In this case, some area of the display 301 at least partially overlapped with the first camera module 307 may include a different pixel structure and/or wiring structure compared to another area. For example, some area of the display 301 at least partially overlapped with the first camera module 307 may have different pixel density compared to another area. The pixel structure and/or wiring structure formed in some area of the display 301 at least partially overlapped with the first camera module 307 can reduce a loss of light between the outside and the first camera module 307. In some embodiment, a pixel may not be disposed in some area of the display 301 at least partially overlapped with the first camera module 307. In some embodiment, the electronic device 200 may further include a light-emitting module (e.g., a light source) disposed within the electronic device 200 in accordance with the first surface 210A. The light-emitting module may provide information on the state of the electronic device 200 in the form of light, for example. In some embodiment, the light-emitting module may provide a light source that interlocks with an operation of the first camera module 307. The light-emitting module may include a light-emitting diode (LED), an IR LED or a xenon lamp, for example.

According to an embodiment, the plurality of second camera modules 308 may have different attributes (e.g., view angles) or functions, and may include a dual camera or a triple camera, for example. The plurality of second camera modules 308 may include a plurality of camera modules including lenses having different view angles. The electronic device 200 may control a view angle of the camera module, which is performed in the electronic device 200, to be changed based on the selection of a user. The plurality of second camera modules 308 may include at least one of a wide-angle camera, a telephoto camera, a color camera, a monochrome camera, or an infrared (IR) camera (e.g., a time of flight (TOF) camera or a structured light camera). In some embodiment, the IR camera may operate as at least a part of the sensor module. The light-emitting module 309 (e.g., a flash) may include a light source for the plurality of second camera modules 308. The light-emitting module 309 may include an LED or a xenon lamp, for example.

The input module 310 may include one or more key input devices, for example. The one or more key input devices may be disposed in an opening formed in the side surface 210C, for example. In some embodiment, the electronic device 200 may not include some or all of the key input devices. A key input device that is not included in the electronic device 200 may be implemented as a soft key by using the display 301. The location of the input module 310 or the number thereof may be various. In some embodiment, the input module 310 may include at least one sensor module.

The first connection terminal module (e.g., a first connector module or a first interface terminal module) 311 may include a first connector (or a first interface terminal) disposed within the electronic device 200 and a first connector hole formed in the side surface 210C in accordance with the first connector, for example. The second connection terminal module (e.g., a second connector module or a second interface terminal module) 312 may include a second connector (or a second interface terminal) disposed within the electronic device 200 and a second connector hole formed in the side surface 210C in accordance with the second connector, for example. The electronic device 200 may transmit and/or receive power and/or data to and/or from an outside electronic device electrically connected to the first connector or the second connector. In an embodiment, the first connector may include a universal serial bus (USB) connector or a high definition multimedia interface (HDMI) connector. In an embodiment, the second connector may include an audio connector (e.g., a headphone connector or an earset connector). The location of the connection terminal module or the number thereof is not limited to the illustrated examples, and may be various.

Figure 4:
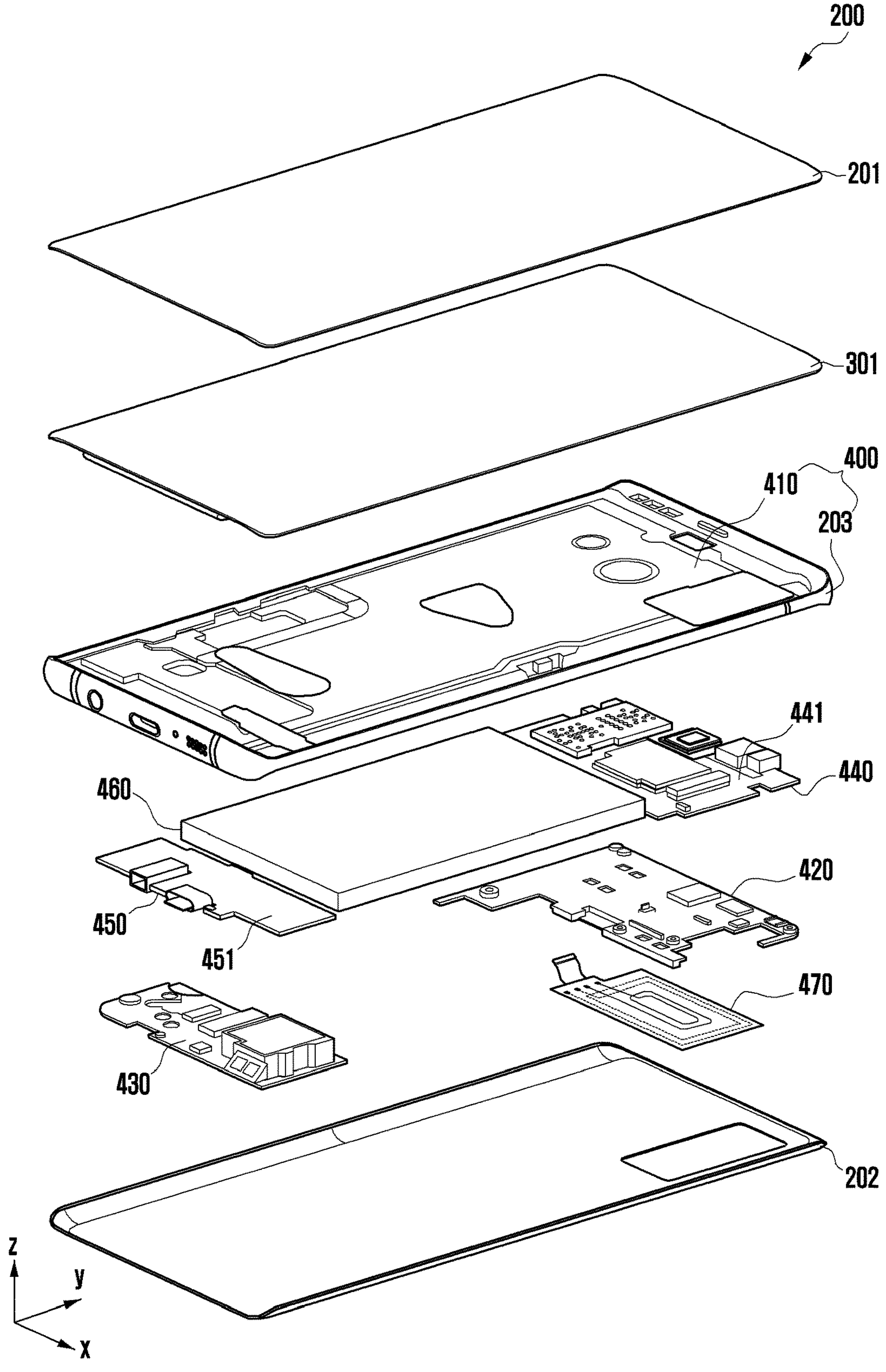
FIG. 4 is an exploded view relating to the electronic device in FIG. 2 according to an embodiment of the disclosure.

FIG. 4 is an exploded view relating to the electronic device 200 in FIG. 2 according to an embodiment of the disclosure.

Referring to FIG. 4, in an embodiment, the electronic device 200 may include the front surface plate 201, the back surface plate 202, the side surface bezel structure 203, a first support member 410, a second support member 420, a third support member 430, the display 301, a first substrate assembly 440, a second substrate assembly 450, a battery 460, or an antenna structure 470. In some embodiment, the electronic device 200 may omit at least one (e.g., the second support member 420 or the third support member 430) of the components or may additionally include another component.

The first support member 410 may be disposed within the electronic device 200 and connected to the side surface bezel structure 203 or may be formed in an integrated manner with the side surface bezel structure 203, for example. The first support member 410 may be formed by using a metal material and/or a non-metal material (e.g., a polymer), for example. In an embodiment, a conduction part included in the first support member 410 may perform an electromagnetic shielding role for the display 301, the first substrate assembly 440 and/or the second substrate assembly 450. The first support member 410 and the side surface bezel structure 203 may be denoted as a front case 400. The first support member 410 is a part of the front case 400 where components, such as the display 301, the first substrate assembly 440, the second substrate assembly 450, or the battery 460, are disposed, and may contribute to the durability or stiffness (e.g., torsional rigidity) of the electronic device 200. Hereinafter, the first support member 410 may be denoted as a support structure (e.g., a bracket or a mounting plate).

The display 301 may be disposed between the support structure 410 and the front surface plate 201, for example, and may be disposed on one surface of the support structure 410. The first substrate assembly 440 and the second substrate assembly 450 may be disposed between the support structure 410 and the back surface plate 202, for example, and may be disposed on the other surface of the support structure 410. The battery 460 may be disposed between the support structure 410 and the back surface plate 202, for example, and may be disposed in the support structure 410.

According to an embodiment, the first substrate assembly 440 may include a first printed circuit substrate 441 (e.g., a printed circuit board (PCB) or a printed circuit board assembly (PCBA)). The first substrate assembly 440 may include various electronic parts electrically connected to the first printed circuit substrate 441. The electronic parts may be disposed in the first printed circuit substrate 441 or may be electrically connected to the first printed circuit substrate 441 through an electrical path, such as a cable or a flexible printed circuit board (FPCB). With reference to FIGS. 2 and 3, the electronic parts may include the second microphone included in the second audio module 303, the second speaker included in the fourth audio module 305, the sensor module 306, the first camera module 307, the plurality of second camera modules 308, the light-emitting module 309, or the input module 310, for example.

According to an embodiment, when viewed from the top (e.g., when viewed in a −z axis direction) of the front surface plate 201, the second substrate assembly 450 may be disposed to be isolated from the first substrate assembly 440 with the battery 460 interposed therebetween. The second substrate assembly 450 may include a second printed circuit substrate 442 electrically connected to the first printed circuit substrate 441 of the first substrate assembly 440. The second substrate assembly 450 may include various electronic parts electrically connected to the second printed circuit substrate 442. The electronic parts may be disposed in the second printed circuit substrate 442 or may be electrically connected to the second printed circuit substrate 442 through an electrical path, such as a cable or an FPCB. With reference to FIGS. 2 and 3, the electronic parts may include the first microphone (or the first microphone module) included in the first audio module 302, the first speaker included in the third audio module 304, the first connector included in the first connection terminal module 311, or the second connector included in the second connection terminal module 312, for example.

According to some embodiment, the first substrate assembly 440 or the second substrate assembly 450 may include a main PCB, a slave PCB disposed in a way to be partially overlapped with the main PCB and/or an interposer substrate between the main PCB and the slave PCB.

The battery 460 is a device for supplying power to at least one component of the electronic device 200, and may include a primary cell incapable of recharging, a secondary cell capable of recharging, or a fuel cell, for example. The battery 460 may be disposed as integrated within the electronic device 200 and may be disposed in a way to be attachable to and detachable from the electronic device 200.

According to an embodiment, the second support member 420 may be disposed between the support structure 410 and the back surface plate 202, and may be combined with the support structure 410 by using a fastening element such as a bolt. At least a part of the first substrate assembly 440 may be disposed between the support structure 410 and the second support member 420. The second support member 420 may protect the first substrate assembly 440 by covering the first substrate assembly 440. When viewed from the top (e.g., when viewed in a +z axis direction) of the back surface plate 202, the third support member 430 may be disposed to be at least partially isolated from the second support member 420 with the battery 460 interposed therebetween. The third support member 430 may be disposed between the support structure 410 and the back surface plate 202, and may be combined with the support structure 410 by using a fastening element such as a bolt. At least a part of the second substrate assembly 450 may be disposed between the support structure 410 and the third support member 430. The third support member 430 may protect the second substrate assembly 450 by covering the second substrate assembly 450. The second support member 420 and/or the third support member 430 may be formed by using a metal material and/or a non-metal material (e.g., a polymer). In some embodiment, the second support member 420 may perform an electromagnetic shielding role for the first substrate assembly 440. The third support member 430 may perform an electromagnetic shielding role for the second substrate assembly 450. In some embodiment, the second support member 420 and/or the third support member 430 may be denoted as a rear case.

According to some embodiment, an integrated substrate assembly including the first substrate assembly 440 and the second substrate assembly 450 may be implemented. For example, when viewed from the top (e.g., when viewed in the +z axis direction) of the back surface plate 202, the substrate assembly may include a first part and a second part that are disposed to be isolated from each other with the battery 460 interposed therebetween and a third part that is extended between the battery 460 and the side surface bezel structure 203 and that connects the first part and the second part. In this case, an integrated support member including the second support member 420 and the third support member 430 may be implemented.

According to an embodiment, the antenna structure 470 may be disposed between the second support member 420 and the back surface plate 202. In some embodiment, the antenna structure 470 may be disposed between the battery 460 and the back surface plate 202. The antenna structure 470 may be implemented in the form of a film such as an FPCB, for example. The antenna structure 470 may include at least one conductive pattern that is used as a loop type radiator. For example, the at least one conductive pattern may include a spiral conductive pattern (e.g., a plane coil or a pattern coil) having a plane form. In an embodiment, the at least one conductive pattern included in the antenna structure 470 may be electrically connected to a wireless communication circuit (or a wireless communication module) included in the first substrate assembly 440. For example, the at least one conductive pattern may be used in short-distance wireless communication, such as near field communication (NFC). Furthermore, for example, the at least one conductive pattern may be used in magnetic secure transmission (MST) that transmits and/or receives magnetic signals. In some embodiment, the at least one conductive pattern included in the antenna structure 470 may be electrically connected to a power transmission and reception circuit included in the first substrate assembly 440. The power transmission and reception circuit may wirelessly receive power from an outside electronic device or wirelessly transmit power to the outside electronic device by using the at least one conductive pattern. The power transmission and reception circuit may include a power management module, and may include a power management integrated circuit (PMIC) or a charger integrated circuit (IC), for example. The power transmission and reception circuit may charge the battery 460 by using power wirelessly received by using the conductive pattern.

According to an embodiment, the electronic device 200 has an external appearance having a bar type or a plate type, but the disclosure is not limited thereto. For example, the illustrated electronic device 200 may be a part of a foldable electronic device, a slidable electronic device, a stretchable electronic device and/or a rollable electronic device.

The electronic device 200 may further include various components depending on a provided form thereof. Such components may not be all enumerated because deformations thereof are various due to a convergence trend of the electronic device 200, but components having a level equivalent to that of the aforementioned components may be further additionally included in the electronic device 200. In various embodiments, specific components may be excluded from the components or a component may be substituted with another component depending on a provided form.

Figure 5:
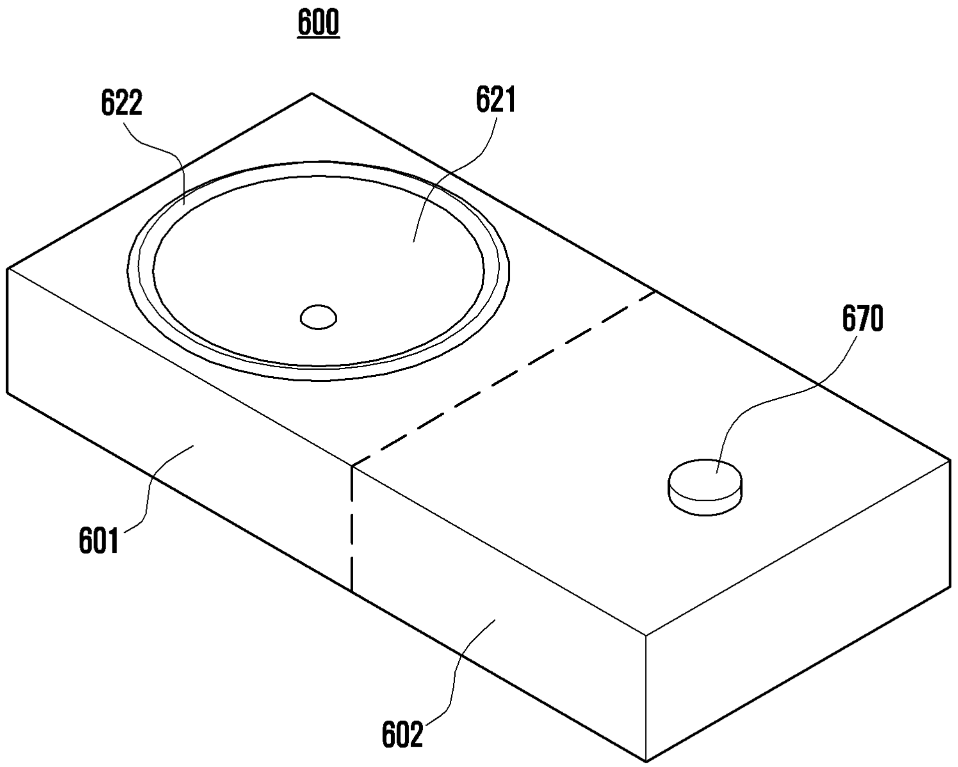
FIG. 5 is a perspective view relating to a speaker module included in an electronic device according to an embodiment of the disclosure.

FIG. 5 is a perspective view relating to a speaker module 600 included in an electronic device (the electronic device 101 in FIG. 1 or the electronic device 200 in FIG. 2) according to an embodiment of the disclosure.

The speaker module 600 may include a first housing 601 and a second housing 602. The first housing 601 and the second housing 602 may form an enclosure of the speaker module 600. The first housing 601 may support a speaker driver 610. The first housing 601 may include a diaphragm 621 and a speaker surround 622 in at least a part thereof. The second housing 602 may include a plug 670 in at least a part thereof. The first housing 601 may include a backward cavity in at least a part thereof within the first housing 601. The second housing 602 may include an adsorption cavity in at least a part thereof within the second housing 602.

Figure 6:
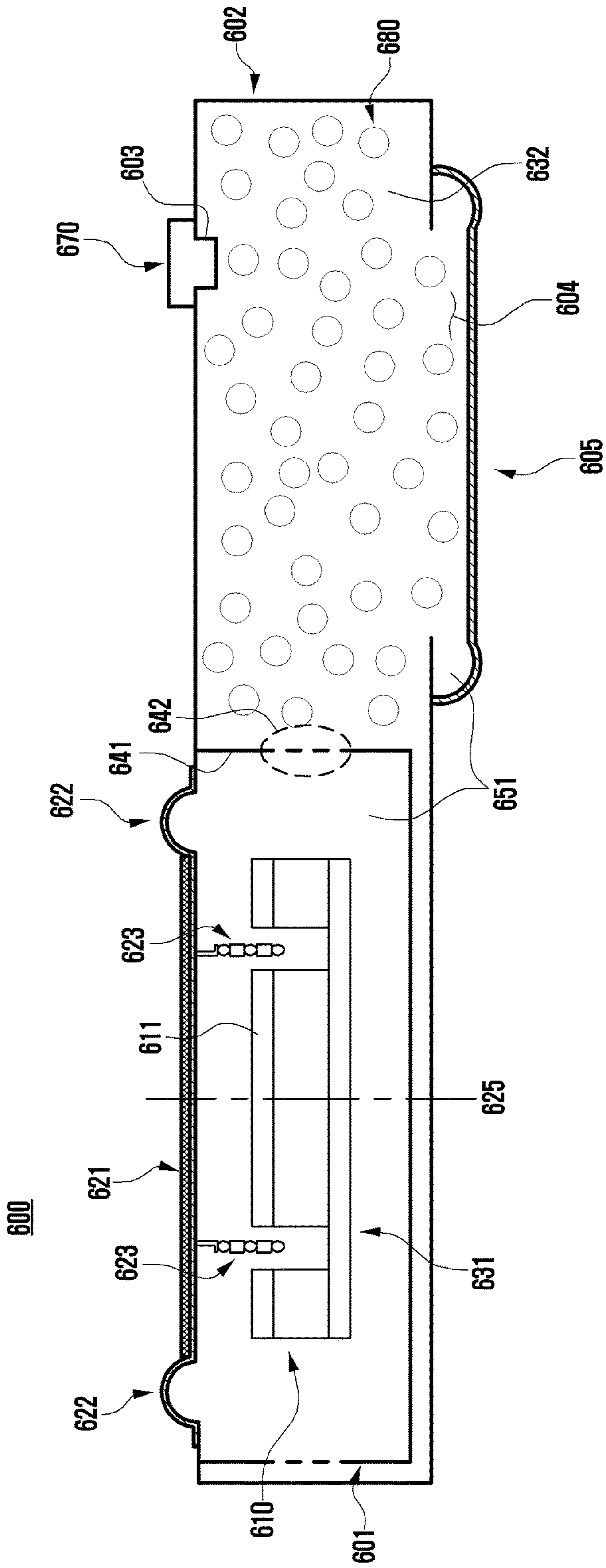
FIG. 6 is a diagram illustrating the speaker module according to an embodiment of the disclosure.

FIG. 6 is a diagram illustrating the speaker module 600 according to an embodiment of the disclosure.

The speaker module 600 may include the first housing 601 and the second housing 602. The first housing 601 and the second housing 602 may form the enclosure of the speaker module 600. The first housing 601 may support the speaker driver 610. The speaker driver 610 may include a magnetic assembly 611, the diaphragm 621, the speaker surround 622, and a voice coil 623.

The magnetic assembly 611 may include a magnet, such as a permanent magnet attached to an upper plate of a front surface and a yoke of a back surface thereof. The upper plate and the yoke may be formed by using a magnetic material in order to generate a magnetic circuit having a magnetic gap in which the voice coil 623 vibrates back and forth. When an electrical audio signal is inputted to the voice coil 623, a mechanical force capable of outputting a sound may be generated by moving the diaphragm 621 along a central axis 625. A movement of the diaphragm 621 for outputting a sound to the outside of the speaker module 600 may push gas (or the air) backward. The sound may be moved through the air in a back volume 651 behind the diaphragm 621. As the back volume 651 increases, a low band sound (e.g., a bass sound) may increase.

The speaker surround 622 may be bent so that the diaphragm 621 may perform an axial motion along the central axis 625. The speaker driver 610 may move the diaphragm 621 back and forth along the central axis 625. For example, the speaker driver 610 may include a motor (not illustrated) attached to the diaphragm 621, and may move the diaphragm 621 back and forth along the central axis 625 by using the motor. The motor may include the voice coil 623 that moves with respect to the magnetic assembly 611.

The back volume 651 may include a rear cavity 631 and an adsorption cavity 632 separated by a permeable structure 641.

The first housing 601 may include the rear cavity 631. The second housing 602 may include the adsorption cavity 632. The permeable structure 641 may include a mesh structure 642. The mesh structure 642 may ventilate the rear cavity 631 and the adsorption cavity 632. The vibration of the air generated from the diaphragm 621 to the rear cavity 631 may be delivered to the adsorption cavity 632 through the mesh structure 642.

The second housing 602 may further include a vent hole 603, the plug 670, an opening 604, and a variable structure 605.

In various embodiments, the second housing 602 may include a plurality of variable structures 605.

The vent hole 603 may be formed when an enclosure including the first housing 601 and/or the second housing 602 is molded or may be formed by puncturing at least a part of the second housing 602. The vent hole 603 may be formed in the second housing 602 for ventilation with the adsorption cavity 632 and an external environment.

In various embodiments, the vent hole 603 may be formed by puncturing at least a part of the variable structure 605.

An adsorptive filler 680 may be filled into the adsorption cavity 632 through the vent hole 603. When the adsorptive filler 680 is filled into the adsorption cavity 632 by a predetermined amount, the plug 670 may be combined with the second housing 602. When the plug 670 is combined with the second housing 602, the adsorptive filler 680 can be prevented from leaking to the outside of the second housing 602. In various embodiments, the adsorptive filler 680 may be a porous material for discharging, condensing, or adsorbing some of the air within the second housing 602. For example, the adsorptive filler 680 may be composed by mixing a binder and at least one of activated carbon-based granular active carbon, powdered activated carbon, ARCP, Cu, Pol, Zr1, Zr2 or A1 particles having a metal organic framework structure, a diatomite-based element, a pearlite or silicon dioxide-based element, or a zeolite-based element, which has various sizes. In an example, the adsorptive filler 680 can minimize that the diaphragm is resisted by the air by positively adsorbing or negatively adsorbing the air as the air within the diaphragm 621 is compressed or expanded by the vibration of the diaphragm 621.

The variable structure 605 may be deformed so that the volume of the adsorption cavity 632 is expanded when the adsorptive filler 680 is filled into the adsorption cavity 632. The variable structure 605 may be included in at least a part of the second housing 602. The variable structure 605 may be disposed in a way to be adjacent to the opening 604 of the second housing 602. At least a part of the variable structure 605 may be supported by the second housing 602. The variable structure 605 may cover the opening 604.

The variable structure 605 may be composed by using an elastic material and/or a plastic material. When the adsorptive filler 680 is filled into the adsorption cavity 632, the variable structure 605 may be expanded and deformed so that the volume of the adsorption cavity 632 can have a first volume V1.

Figure 7:
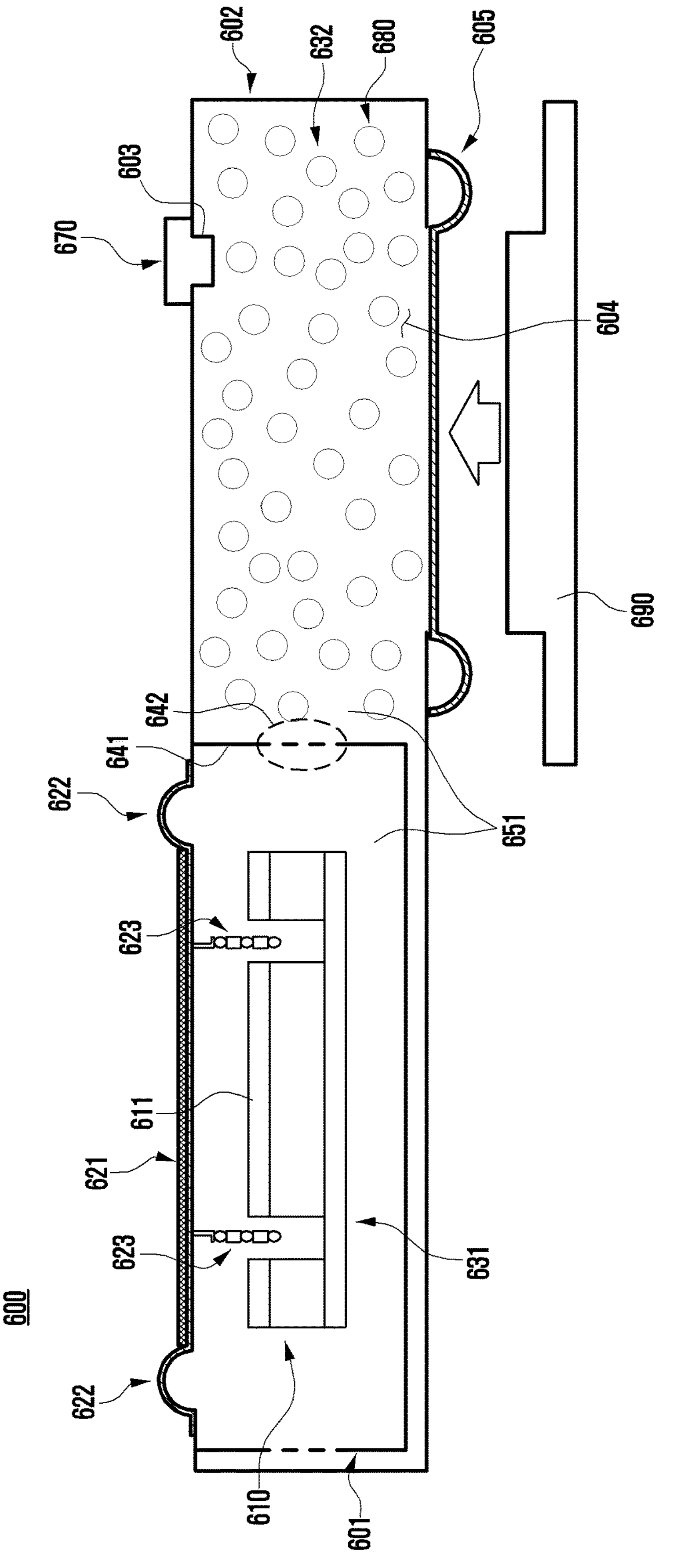
FIG. 7 illustrating a diagram illustrating a combination of the speaker module and housing cover of an electronic device according to an embodiment of the disclosure.

FIG. 7 illustrating a diagram illustrating a combination of the speaker module 600 and housing cover 690 of the electronic device 101 according to an embodiment of the disclosure.

The speaker module 600 in FIG. 7 may have the same structure as the speaker module 600 in FIG. 6. At least a part of the speaker module 600 may be combined with the housing cover 690. At least a part of the housing cover 690 may be combined with the variable structure 605. The housing cover 690 may be the same material as the first housing 601 and/or the second housing 602. The housing cover 690 may be deformed by applying a force to at least a part of the variable structure 605. The variable structure 605 may be changed by an external force. The housing cover 690 may be combined with at least a part of the variable structure 605, and may reduce the volume of the adsorption cavity 632 from the first volume V1 to a second volume V2. The second volume V2 of the adsorption cavity 632 may be smaller than the first volume V1 of the adsorption cavity 632. At least a part of the housing cover 690 may protrude so that the housing cover 690 can correspond to the opening 604. At least a part of the housing cover 690 may protrude so that the housing cover 690 can apply pressure to the variable structure 605. At least a part of the housing cover 690 may be supported by the first housing 601 and/or the second housing 602.

When the volume of the adsorption cavity 632 becomes smaller, an interval between the adsorptive fillers 680 previously filled within the adsorption cavity 632 may become narrow, and entities of the adsorptive filler 680 per unit volume in the adsorption cavity 632 may be increased. When the volume of the adsorption cavity 632 becomes smaller, the density of the adsorptive filler 680 in the adsorption cavity 632 may be increased.

Figure 8:
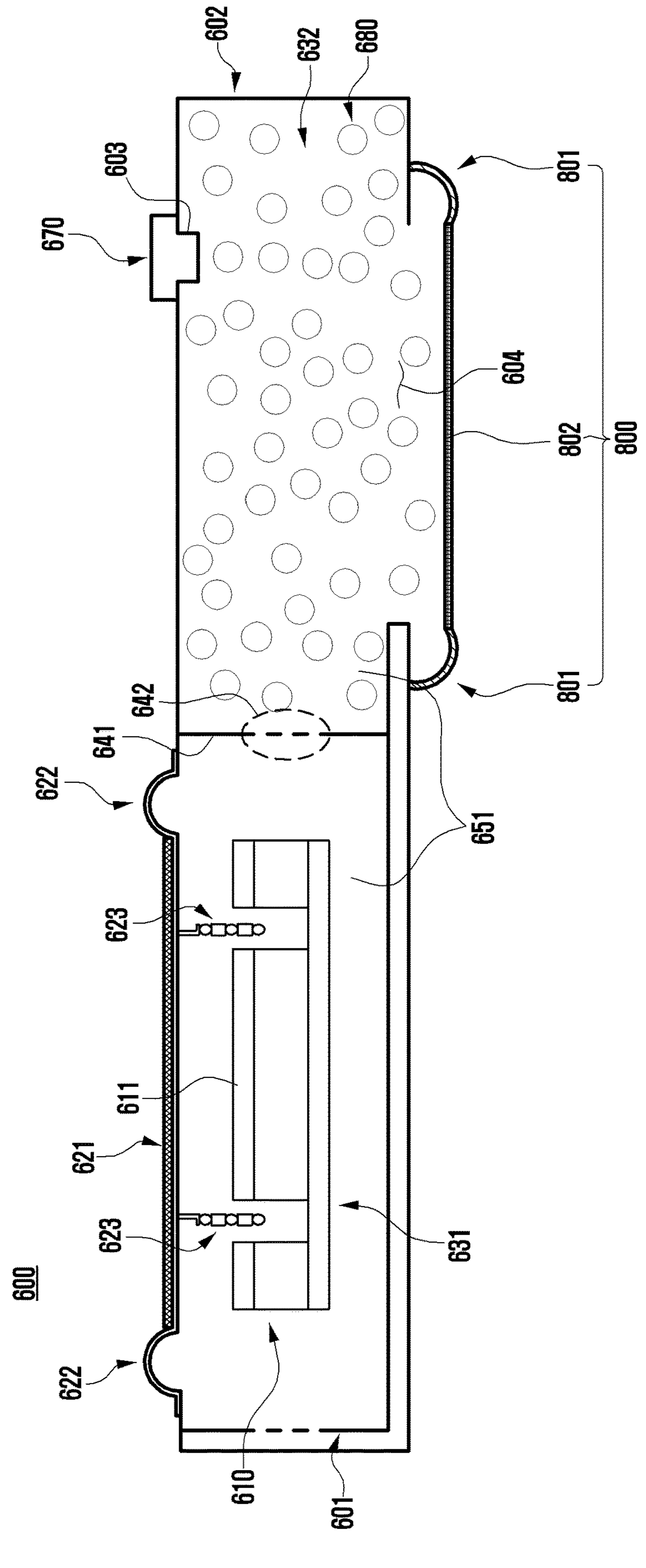
FIG. 8 is a diagram illustrating a variable structure of the speaker module according to an embodiment of the disclosure.

FIG. 8 is a diagram illustrating a variable structure 800 of the speaker module 600 according to an embodiment of the disclosure.

The speaker module 600 in FIG. 8 may have a structure similar to the structure of the speaker module 600 in FIG. 6. The speaker module 600 in FIG. 8 may be the same as the speaker module 600 in FIG. 6 except the variable structure 800.

The variable structure 800 in FIG. 8 may include a support structure 801 and a plate structure 802. The support structure 801 may be a flexible material (e.g., a high function polymer). The plate structure 802 may be a rigid material. For example, the support structure 801 may include polyether ether ketone (PEEK).

The support structure 801 may have at least a part combined with the second housing 602, and may have at least a part combined with the plate structure 802. The plate structure 802 may have at least a part combined with the support structure 801.

In various embodiments, the plate structure 802 may be combined with an outside structure (e.g., the housing cover 690 in FIG. 7). The plate structure 802 may be closely attached to the outside structure (e.g., the housing cover 690 in FIG. 7). The variable structure 800 may cover the opening 604.

In the variable structure 800, a shape of the support structure 801 may be deformed by an external force, and a shape of the plate structure 802 may be maintained. When an external force toward the inside of the second housing 602 is generated in the variable structure 800 by the housing cover 690 in FIG. 7, a shape of the support structure 801 may be deformed, so that the plate structure 802 may be closely attached to the second housing 602. When an external force toward the inside of the second housing 602 is generated in the variable structure 800 by the housing cover 690 in FIG. 7, the plate structure 802 may be closely attached to the second housing 602 while maintaining a shape thereof. When the plate structure 802 is closely attached to the second housing 602 while maintaining a shape thereof, the volume of the adsorption cavity 632 of the second housing 602 may be reduced. For example, when the plate structure 802 is closely attached to the second housing 602 while maintaining a shape thereof, the volume of the adsorption cavity 632 of the second housing 602 may be changed from the first volume V1 to the second volume V2.

Figure 9:
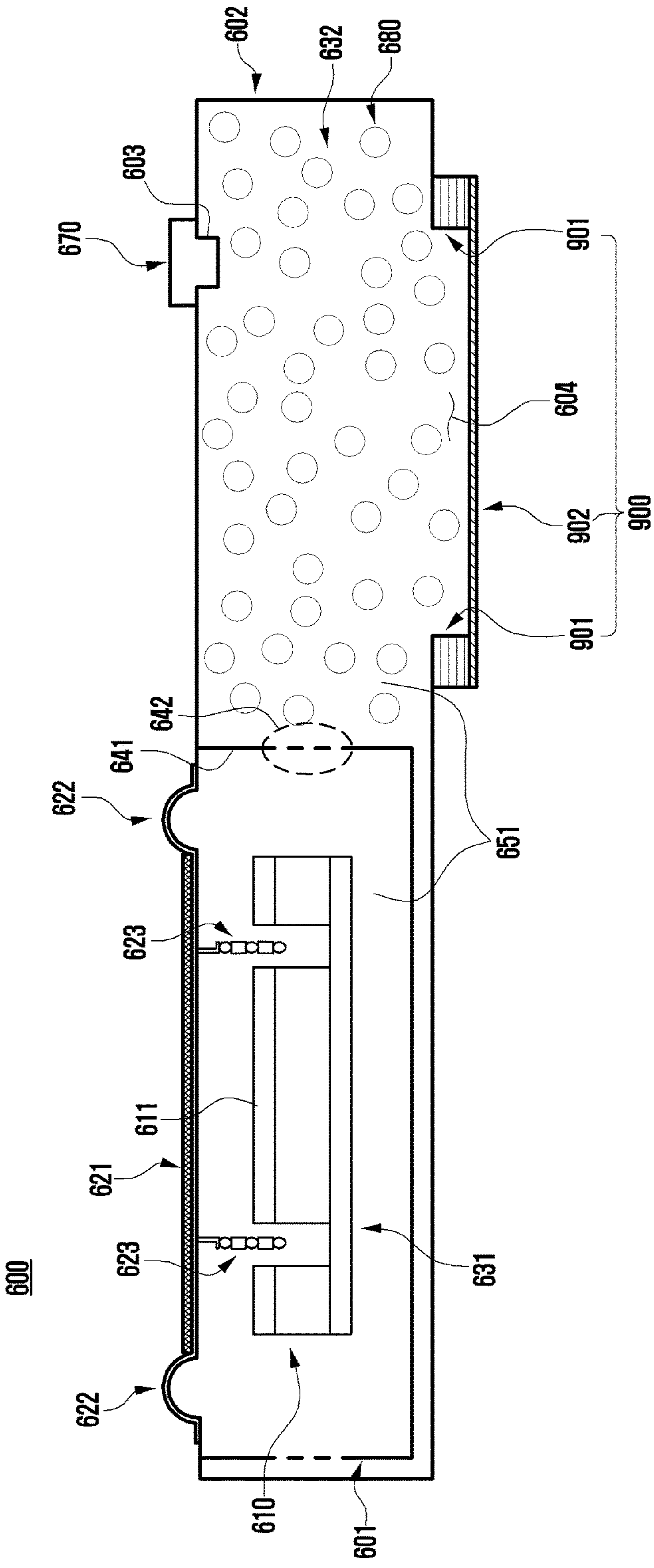
FIG. 9 is a diagram illustrating a variable structure of the speaker module according to an embodiment of the disclosure.

FIG. 9 is a diagram illustrating a variable structure 800 of the speaker module 600 according to an embodiment of the disclosure.

The speaker module 600 in FIG. 9 may have a structure similar to the structure of the speaker module 600 in FIG. 6. The speaker module 600 in FIG. 9 may be the same as the speaker module 600 in FIG. 6 except the variable structure 900.

The variable structure 900 in FIG. 9 may include a compression structure 901 and a plate structure 902. The compression structure 901 may be a compressive material (e.g., sponge). The plate structure 802 may be a rigid material. The compression structure 901 is a compressive material (e.g., sponge), and the volume and/or size thereof may be reduced when an external force is generated.

The compression structure 901 may have at least a part combined with the second housing 602, and may have at least a part combined with the plate structure 902. The plate structure 902 may have at least a part combined with the compression structure 901. The variable structure 900 may cover the opening 604.

In various embodiments, the plate structure 902 may be combined with an outside structure (e.g., the housing cover 690 in FIG. 7). The plate structure 902 may be closely attached to the outside structure (e.g., the housing cover 690 in FIG. 7).

In the variable structure 900, a shape of the compression structure 901 may be deformed by an external force, and a shape of the plate structure 902 may be maintained. When an external force toward the inside of the second housing 602 is generated in the variable structure 800 by the housing cover 690 in FIG. 7, a shape of the compression structure 901 may be deformed, so that the plate structure 902 may be closely attached to the second housing 602. When an external force toward the inside of the second housing 602 is generated in the variable structure 900 by the housing cover 690 in FIG. 7, the plate structure 902 may be closely attached to the second housing 602 while maintaining a shape thereof. When the plate structure 902 is closely attached to the second housing 602 while maintaining a shape thereof, the volume of the adsorption cavity 632 of the second housing 602 may be reduced. For example, when the plate structure 902 is closely attached to the second housing 602 while maintaining a shape thereof, the volume of the adsorption cavity 632 of the second housing 602 may be changed from the first volume V1 to the second volume V2.

Figure 10A:
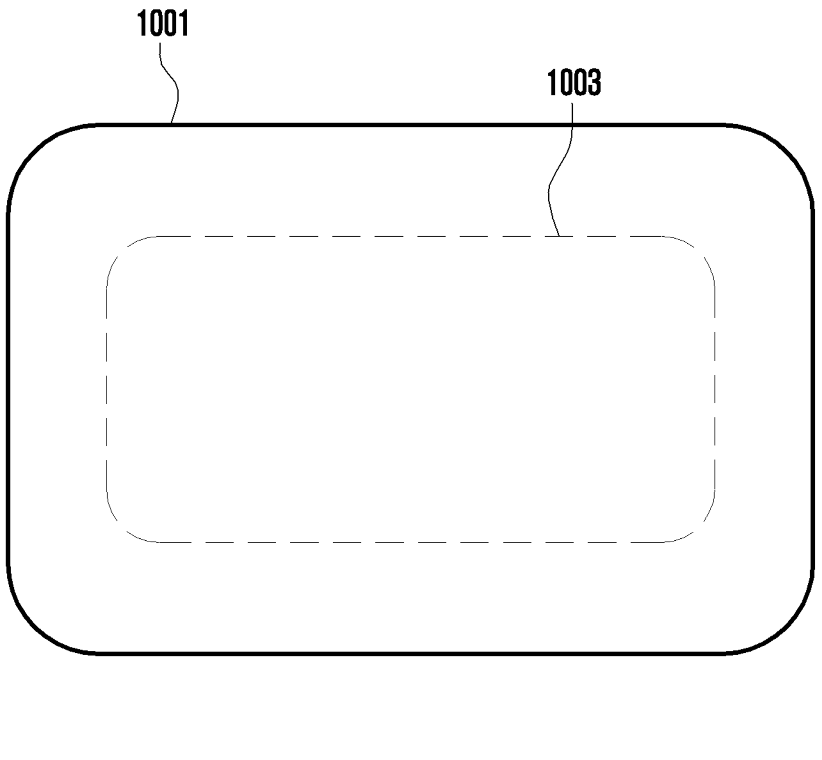
FIGS. 10A and 10B may illustrate variable structures according to various embodiments of the disclosure.
Figure 10B:
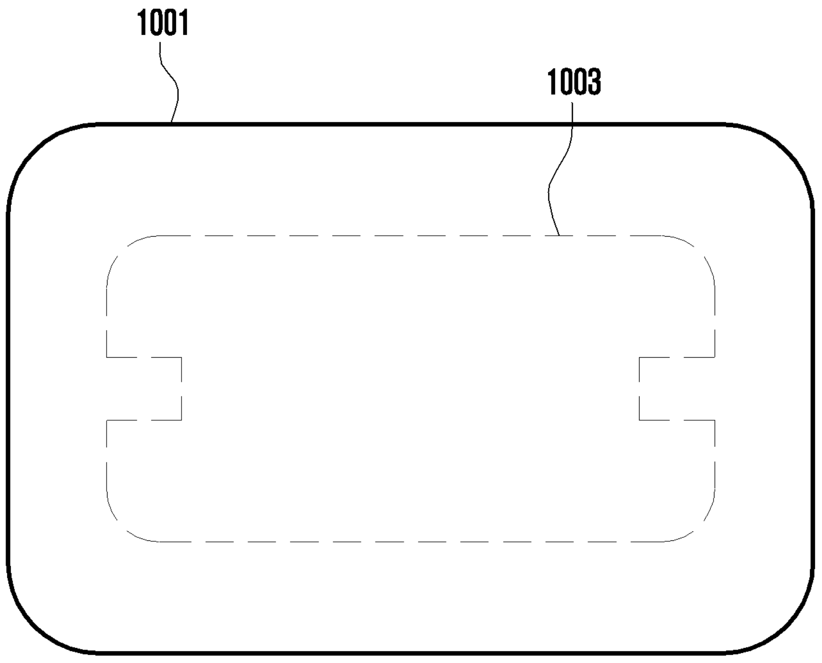

FIGS. 10A and 10B may illustrate variable structures 1001 according to various embodiments of the disclosure.

The variable structure 1001 in FIGS. 10A and 10B may be the same as the variable structure 605 in FIG. 6, the variable structure 605 in FIG. 7, the variable structure 800 in FIG. 8 and/or the variable structure 900 in FIG. 9. The variable structure 1001 may include a first fixed structure 1003 or a second fixed structure 1005 so that the housing cover (690 in FIG. 7) can be fixed to the variable structure 1001. The first fixed structure 1003 or the second fixed structure 1005 may be a depressed structure corresponding to a protruded structure of the housing cover 690.

Figure 11A:
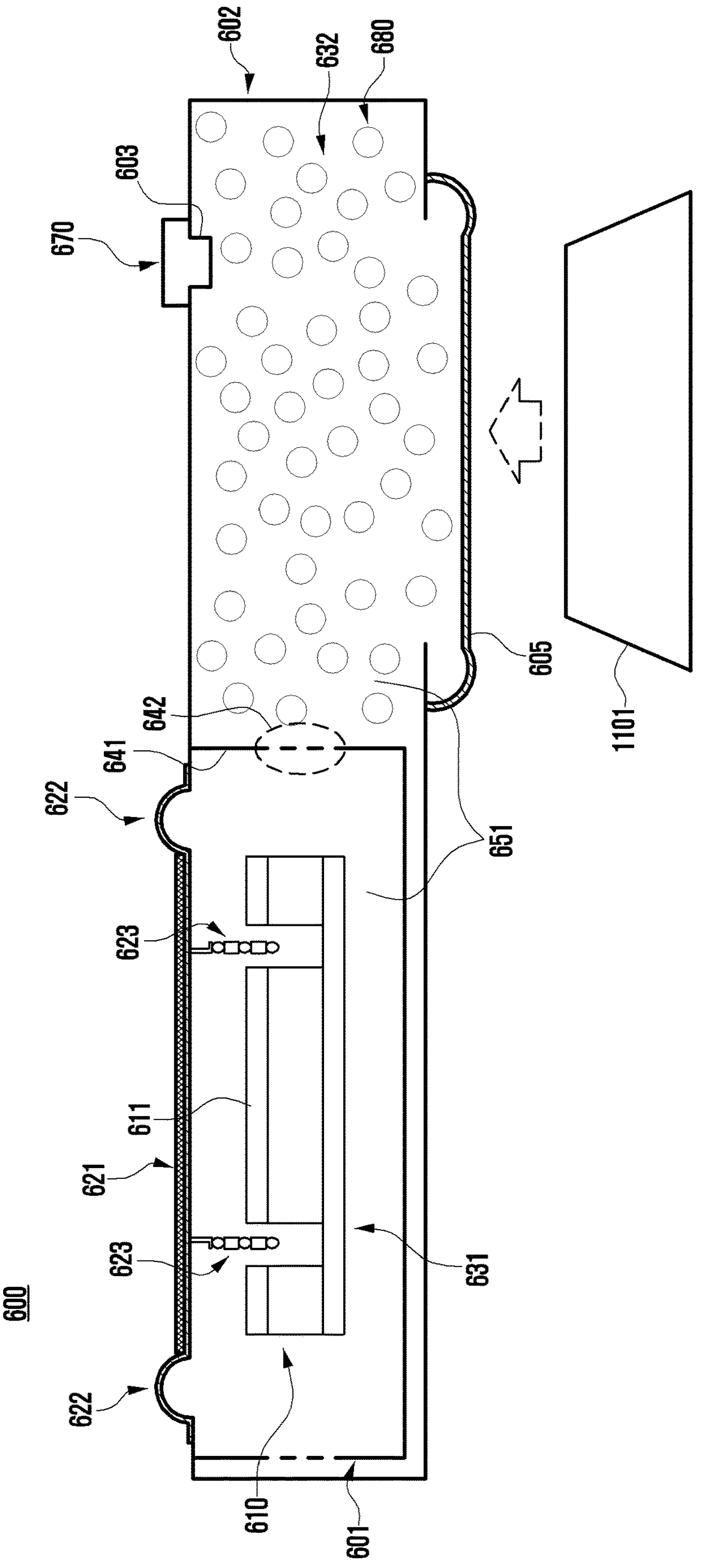
FIG. 11A is a diagram illustrating a state before a filling stopper is combined with the speaker module according to an embodiment of the disclosure.

FIG. 11A is a diagram illustrating a state before a filling stopper 1101 is combined with the speaker module 600 according to an embodiment of the disclosure.

Figure 11B:
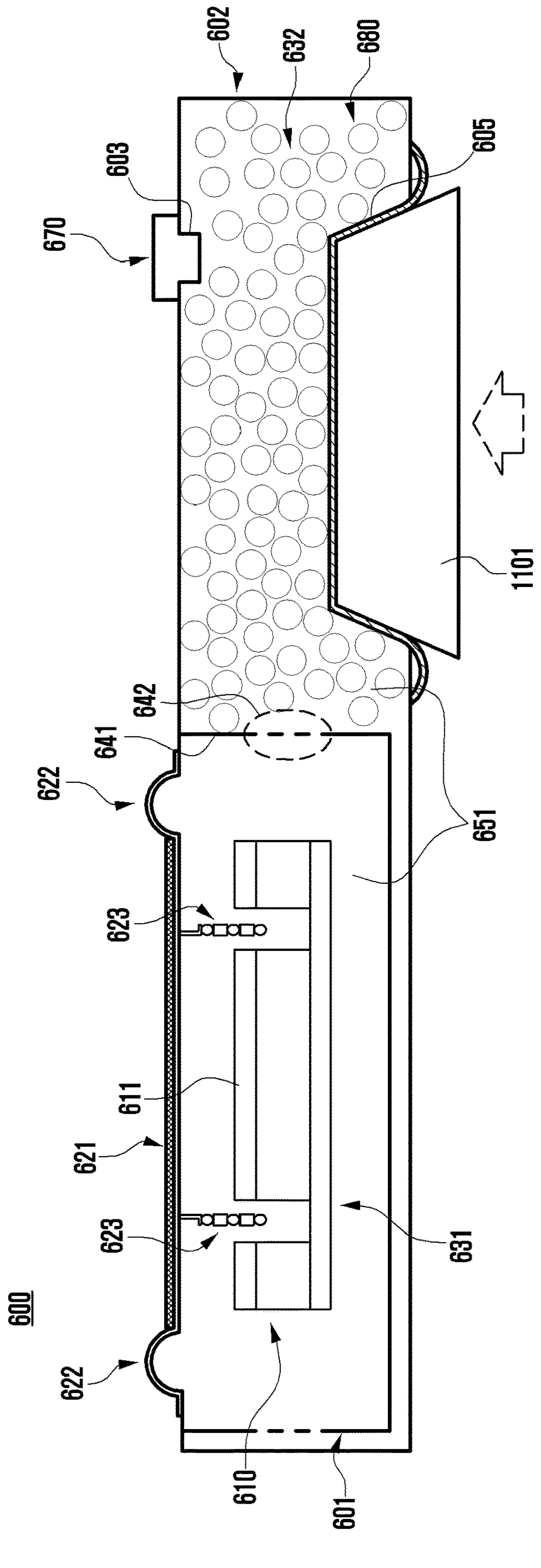
FIG. 11B is a diagram illustrating a state after the filling stopper is combined with the speaker module according to an embodiment of the disclosure.

FIG. 11B is a diagram illustrating a state after the filling stopper 1101 is combined with the speaker module 600 according to an embodiment of the disclosure.

The speaker module 600 in FIGS. 11A and 11B may have a structure similar to the structure of the speaker module 600 in FIG. 6.

The speaker module 600 in FIGS. 11A and 11B may include the variable structure 605 of the speaker module 600 in FIG. 6.

The speaker module 600 in FIGS. 11A and 11B may be combined with the filling stopper 1101 through the opening 604 of the second housing 602. The filling stopper 1101 may include a trapping shape so that the filling stopper 1101 is easily combined with the opening 604 of the second housing 602. The filling stopper 1101 may be composed of a material having elasticity so that the filling stopper 1101 is easily combined with the opening 604 of the second housing 602. The variable structure 605 is a film material having a plastic characteristic, for example, and may be moved into the second housing 602 when the filling stopper 1101 is combined with the second housing 602. The variable structure 605 may cover the opening 604.

When the filling stopper 1101 is combined with the second housing 602 and an external force toward the inside of the second housing 602 is generated, the volume of the adsorption cavity 632 of the second housing 602 may be reduced. For example, when the plate structure 802 is closely attached to the second housing 602 while maintaining a shape thereof, the volume of the adsorption cavity 632 of the second housing 602 may be changed from the first volume V1 to the second volume V2.

When the filling stopper 1101 is combined with the second housing 602, a shape of the variable structure 605 may be deformed. When an external force toward the inside of the second housing 602 is generated by the filling stopper 1101, the volume of the adsorption cavity 632 of the second housing 602 may be reduced. For example, when an external force toward the inside of the second housing 602 is generated by the filling stopper 1101, the volume of the adsorption cavity 632 of the second housing 602 may be changed from the first volume V1 to the second volume V2.

In various embodiments, the speaker module 600 in FIGS. 11A and 11B may not include the variable structure 605 of the speaker module 600 in FIG. 6.

The speaker module 600 in FIGS. 11A and 11B may be combined with the filling stopper 1101 through the opening 604 of the second housing 602. The filling stopper 1101 may include a trapping shape so that the filling stopper 1101 is easily combined with the opening 604 of the second housing 602. The filling stopper 1101 may be composed of a material having elasticity so that the filling stopper 1101 is easily combined with the opening 604 of the second housing 602.

When the filling stopper 1101 is combined with the second housing 602 and an external force toward the inside of the second housing 602 is generated, the volume of the adsorption cavity 632 of the second housing 602 may be reduced. For example, when the filling stopper 1101 is combined with the second housing 602 and an external force toward the inside of the second housing 602 is generated, the volume of the adsorption cavity 632 of the second housing 602 may be changed from the first volume V1 to the second volume V2.

Figure 12:
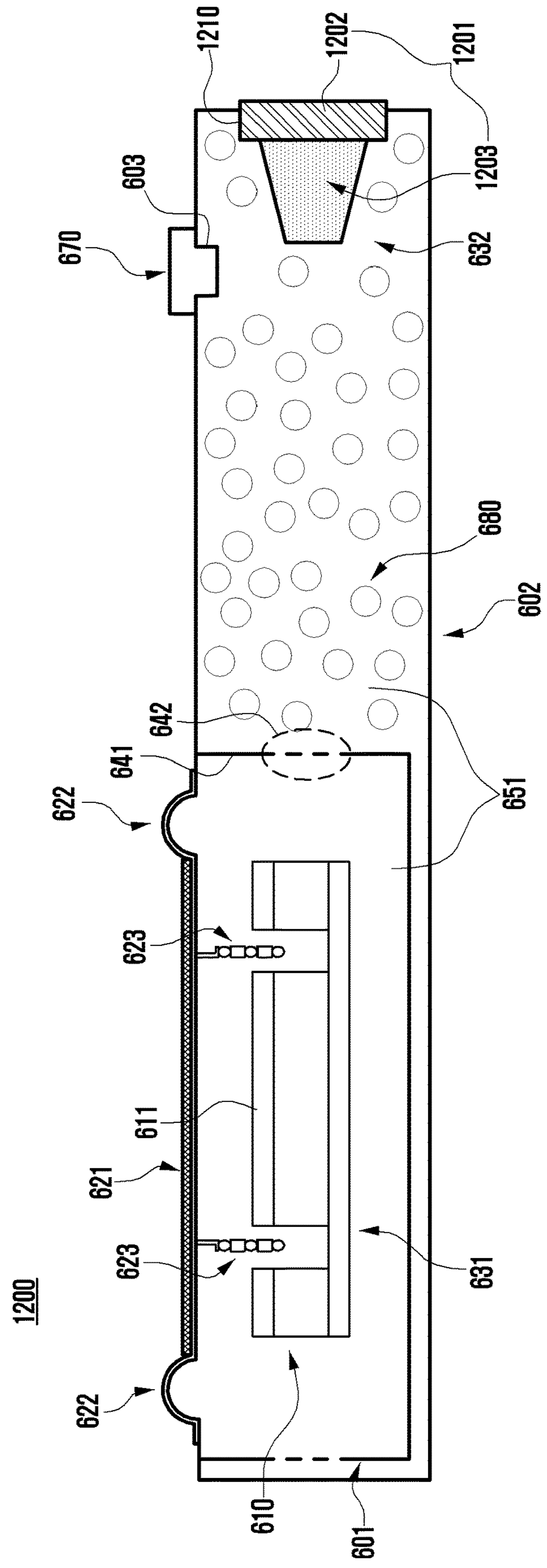
FIG. 12 is a diagram illustrating a speaker module according to an embodiment of the disclosure.

FIG. 12 is a diagram illustrating a speaker module 1200 according to an embodiment of the disclosure.

The speaker module 1200 in FIG. 12 may be different in the second housing 602 of the speaker module 600 in FIG. 6.

The second housing 602 in FIG. 12 may further include the vent hole 603, the plug 670, an adsorptive filler inlet 1210, and an inlet plug 1201.

The vent hole 603 may be formed when an enclosure including the first housing 601 and/or the second housing 602 is molded or may be formed by puncturing at least a part of the second housing 602. The plug 670 may be combined with the vent hole 603.

The second housing 602 may include the adsorptive filler inlet 1210 in at least a part thereof. The adsorptive filler inlet 1210 may be formed when the enclosure including the first housing 601 and/or the second housing 602 is molded or may be formed by puncturing at least a part of the second housing 602.

The adsorptive filler 680 may be injected into the adsorption cavity 632 by a predetermined amount through the adsorptive filler inlet 1210. When the injection of the adsorptive filler 680 is completed, the inlet plug 1201 may be combined with the second housing 602.

The inlet plug 1201 may include a head structure 1202 and a disk structure 1203.

The head structure 1202 may include a trapping shape so that the head structure 1202 is easily combined with the adsorptive filler inlet 1210 of the second housing 602. The head structure 1202 may be composed of a material having elasticity so that the head structure 1202 is easily combined with the adsorptive filler inlet 1210 of the second housing 602.

The disk structure 1203 may be a porous material (e.g., sponge). When the inlet plug 1201 is combined with the second housing 602, the disk structure 1203 may reduce the volume of the adsorption cavity 632 of the second housing 602. When the inlet plug 1201 is combined with the second housing 602, the disk structure 1203 may change the volume of the adsorption cavity 632 from the first volume V1 to the second volume V2.

Figure 13:
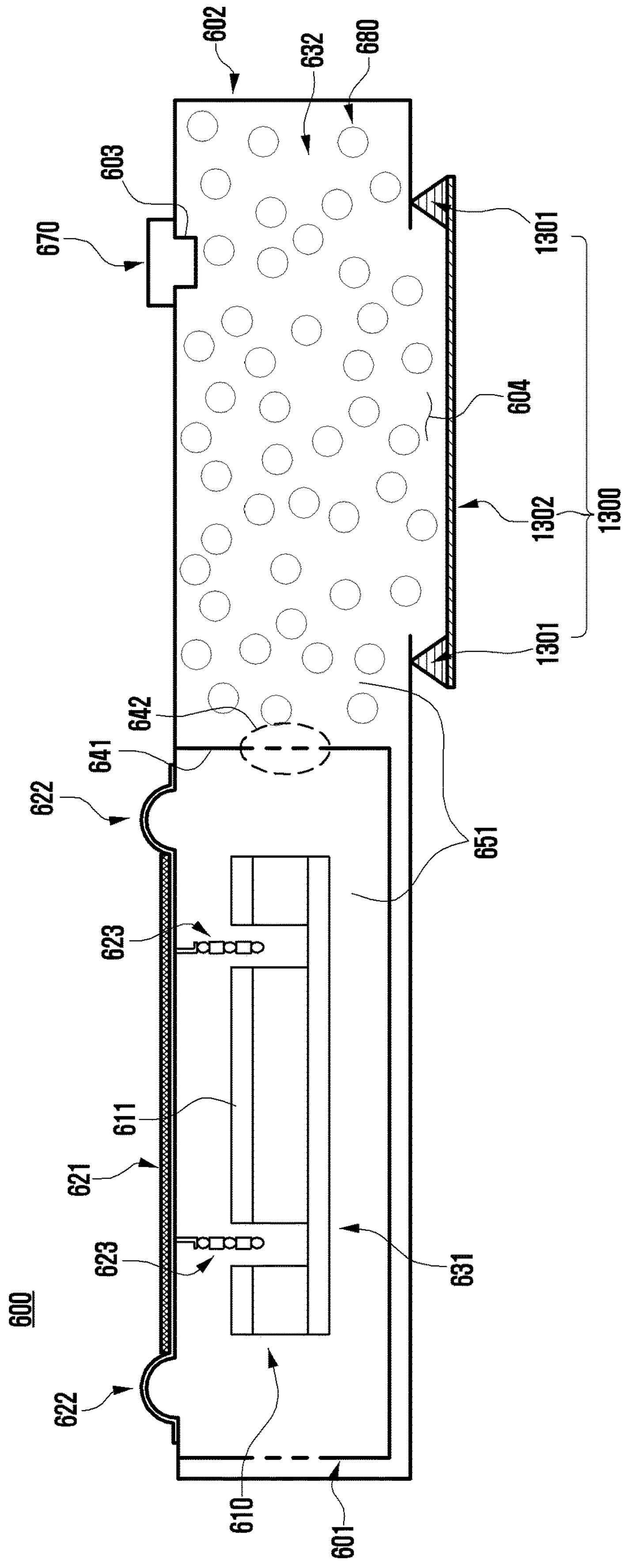
FIG. 13 is a diagram illustrating a variable structure of the speaker module according to an embodiment of the disclosure.

FIG. 13 is a diagram illustrating a variable structure 1300 of the speaker module 600 according to an embodiment of the disclosure.

The speaker module 600 in FIG. 13 may have a structure similar to the structure of the speaker module 600 in FIG. 6. The speaker module 600 in FIG. 13 may be the same as the speaker module 600 in FIG. 6 except the variable structure 1300.

The variable structure 1300 in FIG. 13 may include a combination structure 1301 and a cover structure 1302. The combination structure 1301 and the cover structure 1302 may be ejected into the second housing 602 in an all-in-one form.

In various embodiments, the cover structure 1302 may be combined with an outside structure (e.g., the housing cover 690 in FIG. 7). The cover structure 1302 may be closely attached to the outside structure (e.g., the housing cover 690 in FIG. 7). The variable structure 1300 may cover the opening 604.

A shape of the variable structure 1300 may be deformed by an external force. When an external force toward the inside of the second housing 602 is generated in the variable structure 1300, the volume of the adsorption cavity 632 of the second housing 602 may be reduced. For example, when the cover structure 1302 is closely attached to the second housing 602, the volume of the adsorption cavity 632 of the second housing 602 may be changed from the first volume V1 to the second volume V2.

In various embodiments, when the variable structure 1300 is melted through thermocompression bonding or ultrasonic fusion and an external force is applied to the variable structure 1300 in the direction of the second housing 602, the variable structure 1300 may be sealed to the second housing 602. When the variable structure 1300 is sealed to the second housing 602, the volume of the adsorption cavity 632 of the second housing 602 may be reduced.

Figure 14:
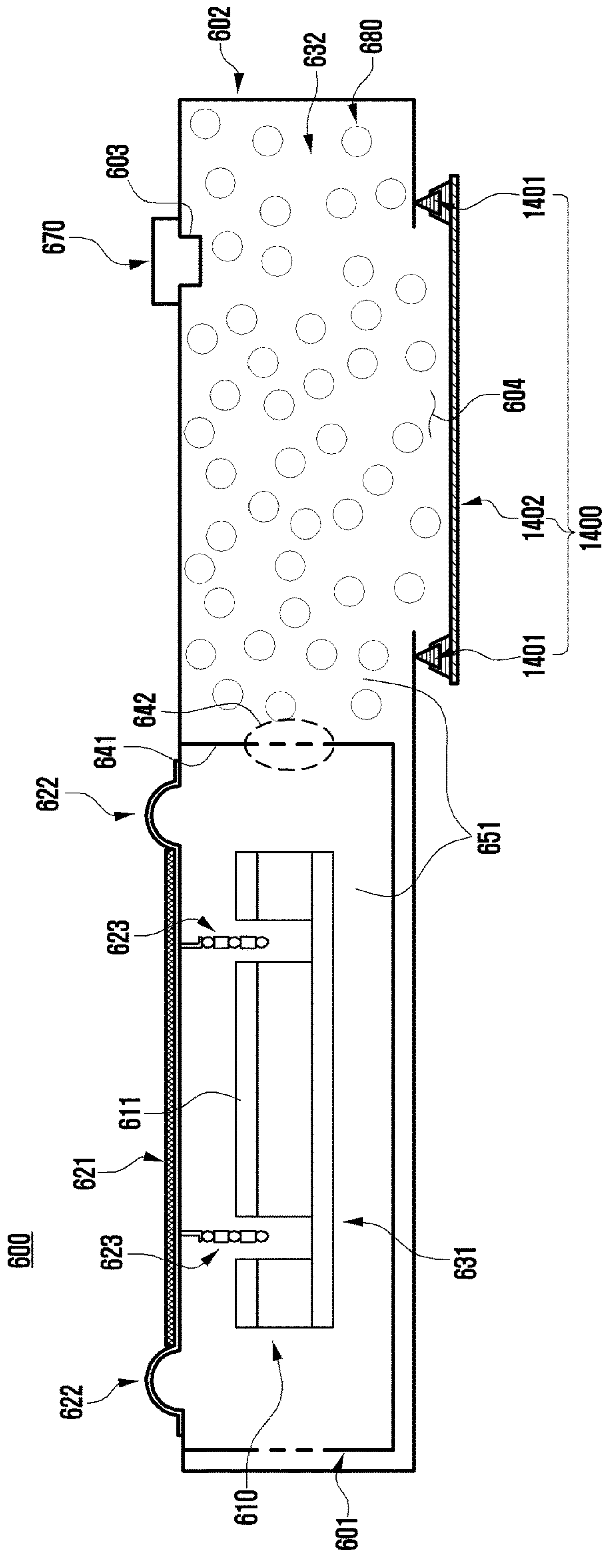
FIG. 14 is a diagram illustrating a variable structure of the speaker module according to an embodiment of the disclosure.

FIG. 14 is a diagram illustrating a variable structure 1400 of the speaker module 600 according to an embodiment of the disclosure.

The speaker module 600 in FIG. 14 may have a structure similar to the structure of the speaker module 600 in FIG. 6. The speaker module 600 in FIG. 14 may be the same as the speaker module 600 in FIG. 6 except the variable structure 1400.

The variable structure 1400 in FIG. 14 may include a combination structure 1401 and a cover structure 1402. The combination structure 1401 and the cover structure 1402 may be ejected by being separated from the second housing 602, and may be combined with the second housing 602 through ultrasonic welding.

In various embodiments, the cover structure 1402 may be combined with an outside structure (e.g., the housing cover 690 in FIG. 7). The cover structure 1402 may be closely attached to the outside structure (e.g., the housing cover 690 in FIG. 7). The variable structure 1400 may cover the opening 604.

A shape of the variable structure 1400 may be deformed by an external force. When an external force toward the inside of the second housing 602 is generated in the variable structure 1400, the volume of the adsorption cavity 632 of the second housing 602 may be reduced. For example, when the cover structure 1402 is closely attached to the second housing 602, the volume of the adsorption cavity 632 of the second housing 602 may be changed from the first volume V1 to the second volume V2.

In various embodiments, when the variable structure 1400 is melted through thermocompression bonding or ultrasonic fusion and an external force is applied to the variable structure 1400 in the direction of the second housing 602, the variable structure 1400 may be sealed to the second housing 602. When the variable structure 1400 is sealed to the second housing 602, the volume of the adsorption cavity 632 of the second housing 602 may be reduced.

Figure 15:
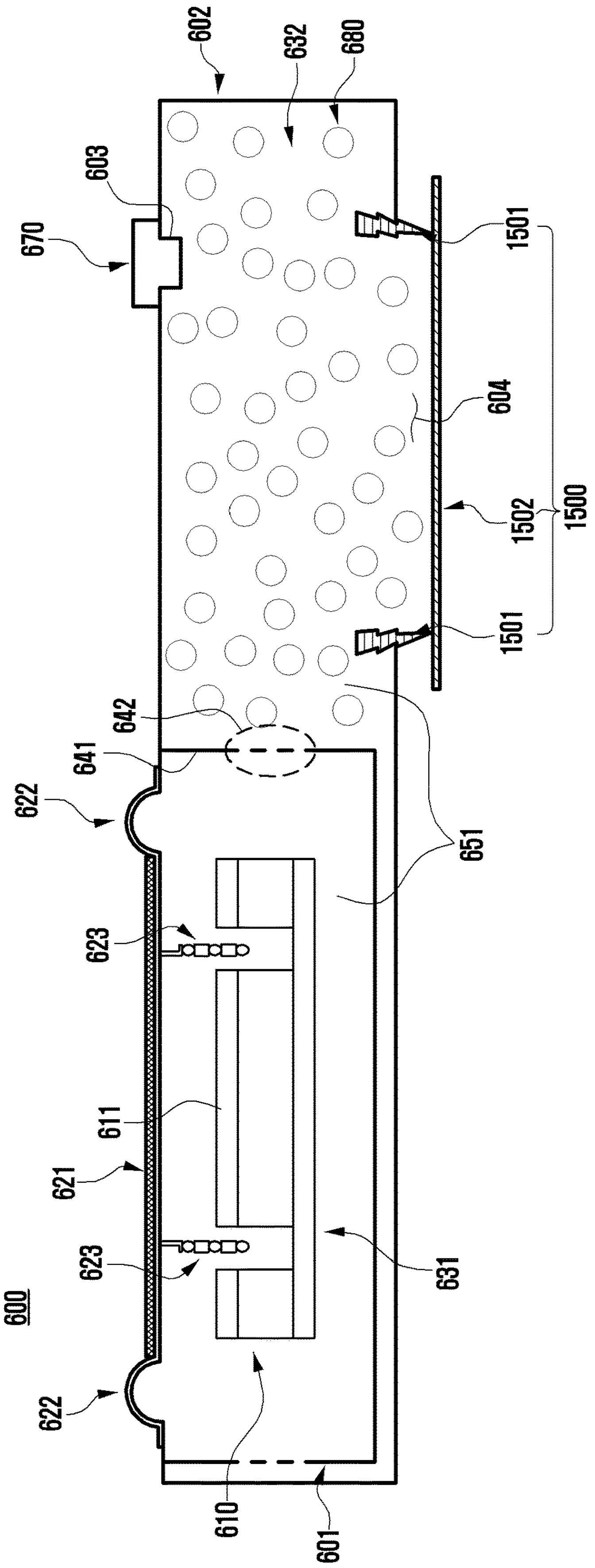
FIG. 15 is a diagram illustrating a variable structure of the speaker module according to an embodiment of the disclosure.

FIG. 15 is a diagram illustrating a variable structure 1500 of the speaker module 600 according to an embodiment of the disclosure.

The speaker module in FIG. 15 may have a structure similar to the structure of the speaker module 600 in FIG. 6. The speaker module in FIG. 15 may be the same as the speaker module 600 in FIG. 6 except the variable structure 1500.

The variable structure 1500 in FIG. 15 may include a screw structure 1501 and a cover structure 1502.

The screw structure 1501 may have at least a part combined with the second housing 602, and may have at least a part combined with the cover structure 1502. The cover structure 1502 may have at least a part combined with the screw structure 1501.

In various embodiments, the cover structure 1502 may be combined with an outside structure (e.g., the housing cover 690 in FIG. 7). The cover structure 1502 may be closely attached to the outside structure (e.g., the housing cover 690 in FIG. 7). The variable structure 1500 may cover the opening 604.

In various embodiments, when the screw structure 1501 is tightened, the cover structure 1502 may be combined with the second housing 602. When the screw structure 1501 is tightened, the cover structure 1502 may be closely attached to the second housing 602.

A shape of the variable structure 1500 may be deformed by an external force. When an external force toward the inside of the second housing 602 is generated in the variable structure 1500, the volume of the adsorption cavity 632 of the second housing 602 may be reduced. For example, when the cover structure 1502 is closely attached to the second housing 602, the volume of the adsorption cavity 632 of the second housing 602 may be changed from the first volume V1 to the second volume V2.

Figure 16:
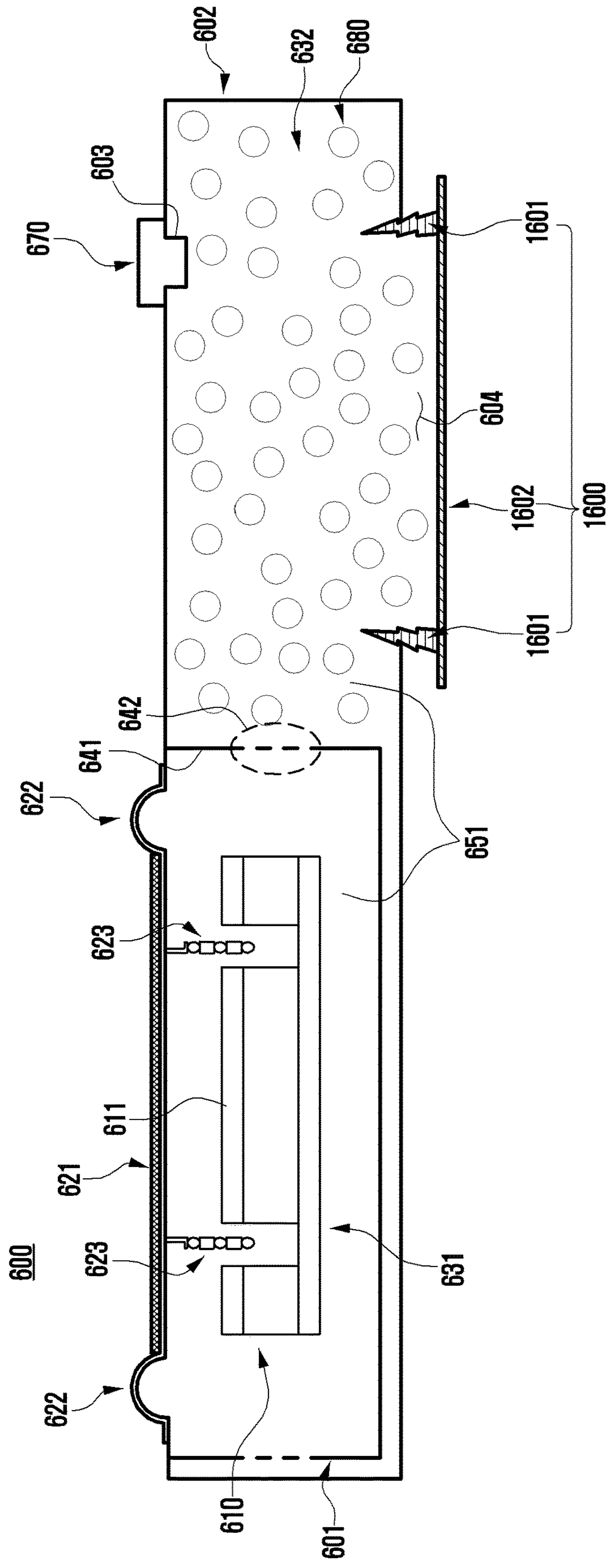
FIG. 16 is a diagram illustrating a variable structure of the speaker module according to an embodiment of the disclosure.

FIG. 16 is a diagram illustrating a variable structure 1600 of the speaker module 600 according to an embodiment of the disclosure.

The speaker module 600 in FIG. 16 may have a structure similar to the structure of the speaker module 600 in FIG. 6. The speaker module 600 in FIG. 16 may be the same as the speaker module 600 in FIG. 6 except the variable structure 1600.

The variable structure 1600 in FIG. 16 may include a hook structure 1601 and a cover structure 1602.

The hook structure 1601 may have at least a part combined with the second housing 602, and may have at least a part combined with the cover structure 1602. The cover structure 1602 may have at least a part combined with the hook structure 1601.

In various embodiments, when the hook structure 1601 is pushed in the direction of the second housing 602, the cover structure 1602 may be combined with the second housing 602. When the hook structure 1601 is pushed in the direction of the second housing 602, the cover structure 1602 may be closely attached to the second housing 602. When pressure is applied to the hook structure 1601 in the direction of the second housing 602, the cover structure 1602 may be closely attached to the second housing 602. The variable structure 1600 may cover the opening 604.

In various embodiments, the cover structure 1602 may be combined with an outside structure (e.g., the housing cover 690 in FIG. 7). The cover structure 1602 may be closely attached to the outside structure (e.g., the housing cover 690 in FIG. 7).

A shape of the variable structure 1600 may be deformed by an external force. When an external force toward the inside of the second housing 602 is generated in the variable structure 1600, the volume of the adsorption cavity 632 of the second housing 602 may be reduced. For example, when the cover structure 1602 is closely attached to the second housing 602, the volume of the adsorption cavity 632 of the second housing 602 may be changed from the first volume V1 to the second volume V2.

Figure 17:
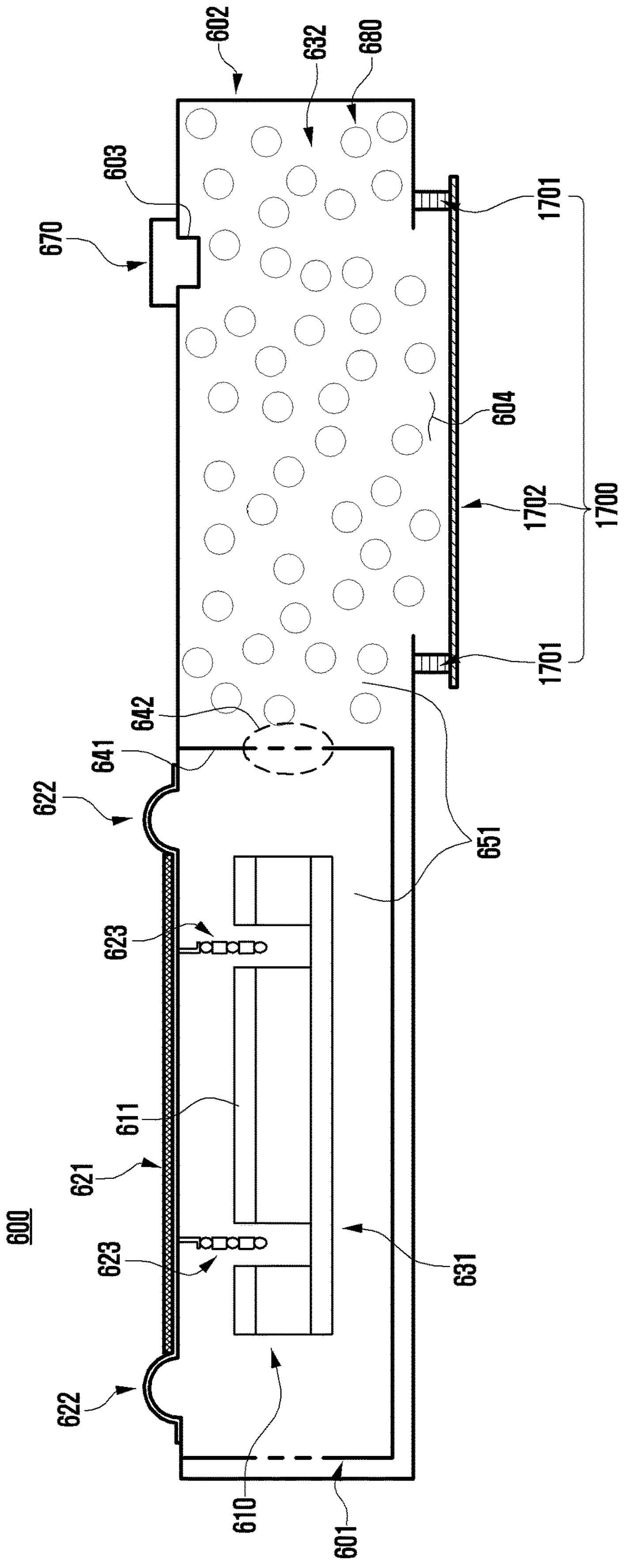
FIG. 17 is a diagram illustrating a variable structure of the speaker module according to an embodiment of the disclosure.

FIG. 17 is a diagram illustrating a variable structure 1700 of the speaker module 600 according to an embodiment of the disclosure.

The speaker module 600 in FIG. 17 may have a structure similar to the structure of the speaker module 600 in FIG. 6. The speaker module 600 in FIG. 17 may be the same as the speaker module 600 in FIG. 6 except the variable structure 1700.

The variable structure 1700 in FIG. 17 may include a thermoplastic support structure 1701 and a cover structure 1702.

The thermoplastic support structure 1701 may have at least a part combined with the second housing 602, and may have at least a part combined with the cover structure 1702. The cover structure 1702 may have at least a part combined with the thermoplastic support structure 1701.

In various embodiments, when the thermoplastic support structure 1701 is hardened after thermal processing, the cover structure 1702 may be combined with the second housing 602.

In various embodiments, the cover structure 1702 may be combined with an outside structure (e.g., the housing cover 690 in FIG. 7). The cover structure 1702 may be closely attached to the outside structure (e.g., the housing cover 690 in FIG. 7). The variable structure 1700 may cover the opening 604.

When the cover structure 1702 is closely attached to or combined with the second housing 602, the volume of the adsorption cavity 632 of the second housing 602 may be reduced. For example, when the cover structure 1702 is closely attached to the second housing 602, the volume of the adsorption cavity 632 of the second housing 602 may be changed from the first volume V1 to the second volume V2.

Figure 18:
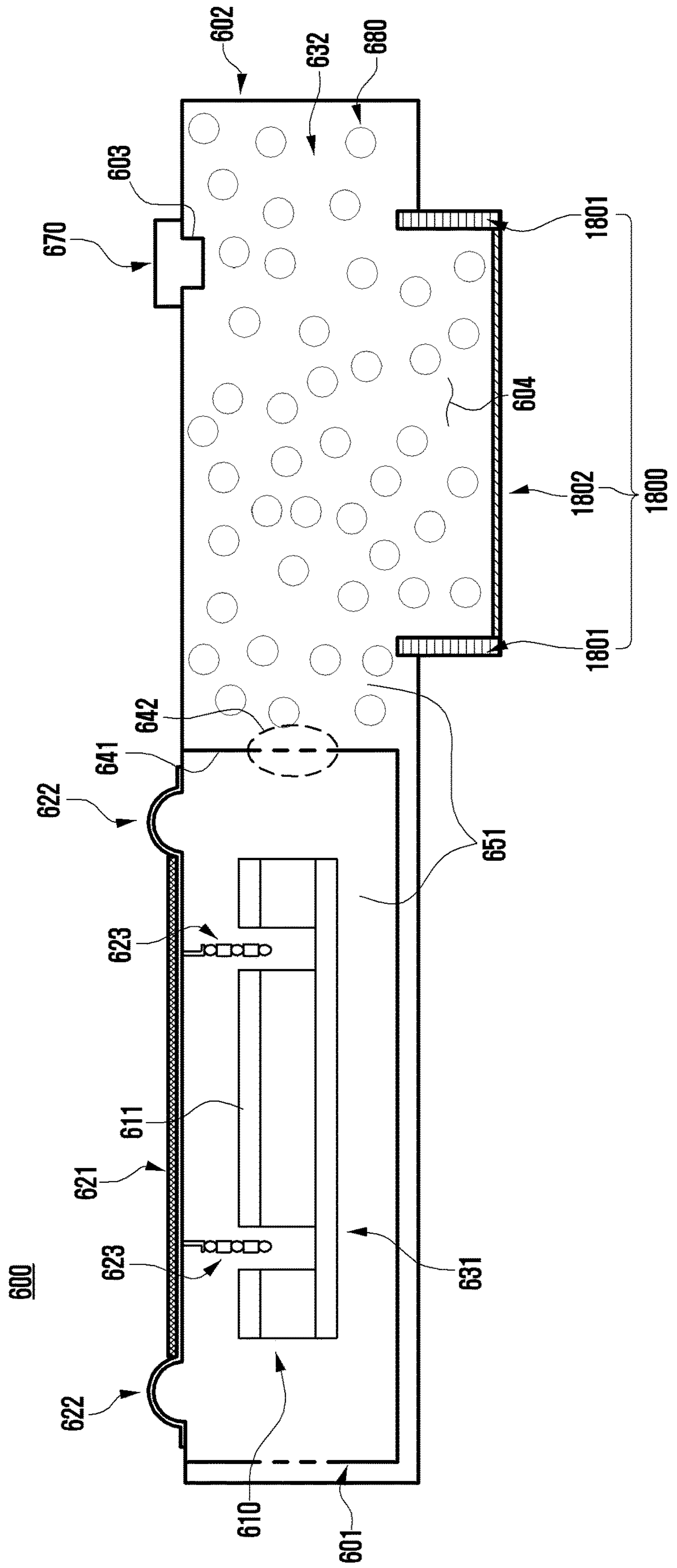
FIG. 18 is a diagram illustrating a variable structure of the speaker module according to an embodiment of the disclosure.

FIG. 18 is a diagram illustrating a variable structure 1800 of the speaker module 600 according to an embodiment of the disclosure.

The speaker module 600 in FIG. 18 may have a structure similar to the structure of the speaker module 600 in FIG. 6. The speaker module 600 in FIG. 18 may be the same as the speaker module 600 in FIG. 6 except the variable structure 1800.

The variable structure 1800 in FIG. 18 may include an elastic support structure 1801 and a cover structure 1802.

The elastic support structure 1801 may have at least a part combined with the second housing 602, and may have at least a part combined with the cover structure 1802. The cover structure 1802 may have at least a part combined with the elastic support structure 1801.

In various embodiments, the elastic support structure 1801 may be a silicon material. The elastic support structure 1801 may have the cover structure 1802 combined with the second housing 602 by its elasticity.

In various embodiments, the cover structure 1802 may be combined with an outside structure (e.g., the housing cover 690 in FIG. 7). The cover structure 1802 may be closely attached to the outside structure (e.g., the housing cover 690 in FIG. 7). The variable structure 1800 may cover the opening 604.

When the cover structure 1802 is closely attached to or combined with the second housing 602, the volume of the adsorption cavity 632 of the second housing 602 may be reduced. For example, when the cover structure 1802 is closely attached to the second housing 602, the volume of the adsorption cavity 632 of the second housing 602 may be changed from the first volume V1 to the second volume V2.

Figure 19:
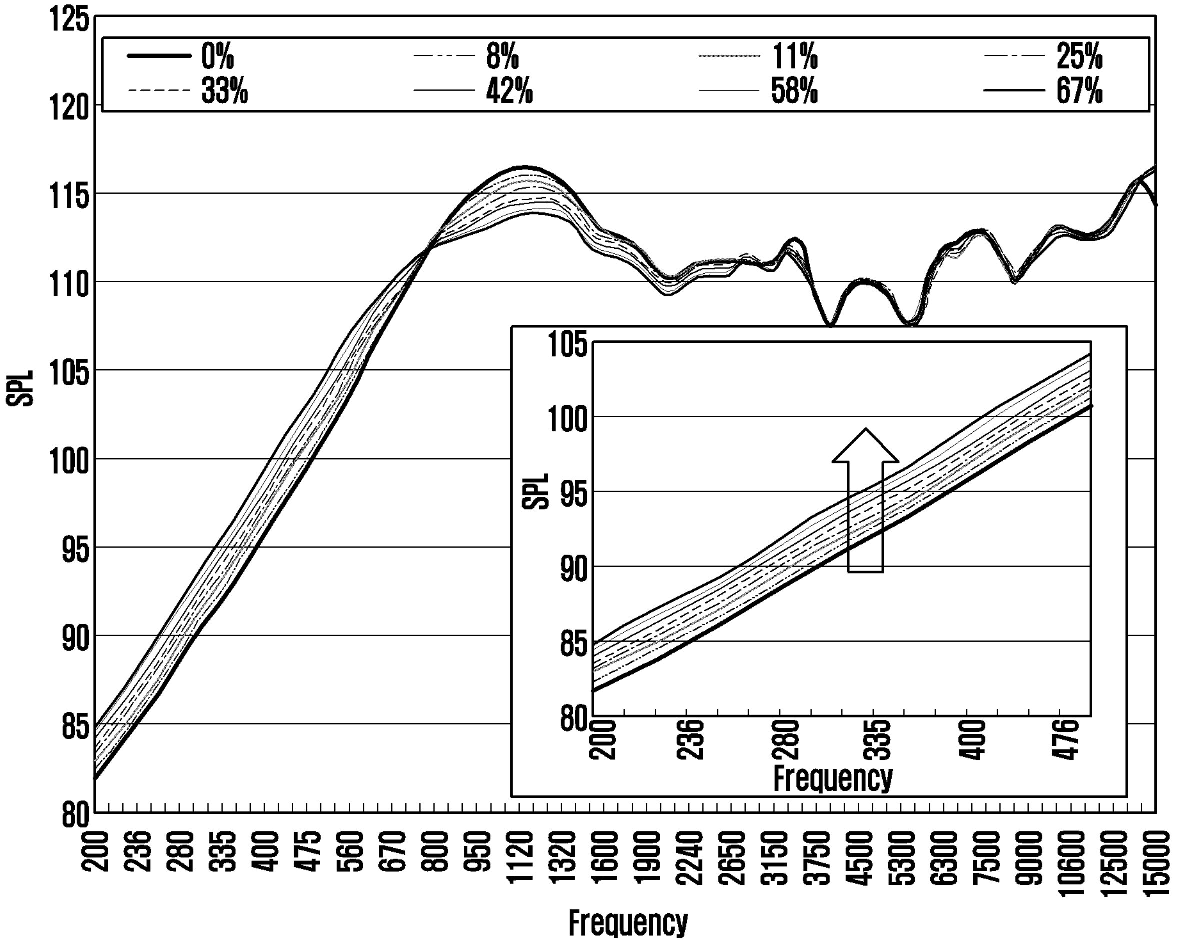
FIG. 19 is a graph illustrating acoustic performance according to a filling ratio of an adsorptive filler within a second housing according to an embodiment of the disclosure.

FIG. 19 is a graph illustrating acoustic performance according to a filling ratio of the adsorptive filler 680 within the second housing 602 according to an embodiment of the disclosure.

The speaker module 600 included in the electronic device 101 may have a high sound pressure level (SPL) of a low band (e.g., 200 Hz to 500 Hz) as the filling ratio of the adsorptive filler 680 within the second housing 602 becomes higher.

Referring to FIG. 19, the speaker module 600 according to various embodiments of the disclosure may fill, with the adsorptive filler 680, the second housing 602 which may be deformed before and after the back surface space is filled. A conventional speaker module having a fixed back surface space requires a lot of time taken to fill the adsorptive filler 680 and cannot secure the filling ratio as much as required. However, the speaker module 600 according to various embodiments of the disclosure can secure the filling ratio in a way to deform a space by inserting the adsorptive filler 680, corresponding to a desired SPL, into the second housing 602 upon fabrication.

The electronic device according to various embodiments disclosed in this document may be various types of devices. The electronic device may include a portable communication device (e.g., a smartphone), a computer device, a portable multimedia device, a portable medical device, a camera, a wearable device, or home appliances, for example. The electronic device according to various embodiments of this document is not limited to the aforementioned devices.

Various embodiments of this document and terms used in the embodiments are not intended to limit the technical characteristics, described in this document, to specific embodiments, and should be understood as including various changes, equivalents or alternatives of a corresponding embodiment. In relation to the description of the drawings, similar reference numerals may be used for similar or related elements. A singular form of a noun corresponding to an item may include one item or a plurality of items unless explicitly described otherwise in the context. In this document, each of phrases, such as "A or B", "at least one of A and B", "at least one of A or B", "A, B or C", "at least one of A, B and C", and "at least one of A, B, or C", may include any one of items listed along with a corresponding one of the phrases or all possible combinations of the listed items. Terms, such as a "first", a "second", or "the first" or "the second", may be used to merely distinguish between a corresponding element and another corresponding element, and do not limit corresponding elements in another aspect (e.g., importance or a sequence). If any (e.g., first) element is described as being "coupled" or "connected" to another (e.g., a second) element along with a term "functionally" or "communicatively" or without such a term, this means that the any element may be coupled to the another element directly (e.g., in a wired way), wirelessly, or through a third element.

The term "module" used in various embodiments of this document may include a unit implemented as hardware, software or firmware, and may be interchangeably used with a term, such as logic, a logical block, a part, or a circuit. The module may be an integrated part, or a minimum unit of the part or a part thereof, which performs one or more functions. For example, according to an embodiment, the module may be implemented in the form of an application-specific integrated circuit (ASIC).

Various embodiments of this document may be implemented as software (e.g., the program 140) including one or more instructions stored in a storage medium (e.g., the embedded memory 136 or the external memory 138) readable by a machine (e.g., the electronic device 101). For example, a processor (e.g., the processor 120) of a machine (e.g., the electronic device 101) may invoke at least one of the one or more instructions stored in the storage medium, and may execute the instruction. This enables the machine to operate to perform at least one function based on the invoked at least one instruction. The one or more instructions may include a code generated by a complier or a code executable by an interpreter. The machine-readable storage media may be provided in the form of a non-transitory storage medium. In this case, "non-transitory" merely means that the storage medium is a tangible device and does not include a signal (e.g., electromagnetic wave). The term does not distinguish between a case where data is semi-permanently stored in the storage medium and a case where data is temporally stored in the storage medium.

According to an embodiment, the method according to various embodiments disclosed in this document may be included in a computer program product and provided. The computer program product may be traded as a product between a seller and a purchaser. The computer program product may be distributed in the form of a machine-readable storage medium (e.g., a compact disc read only memory (CD-ROM)) or may be distributed through an app store (e.g., PlayStore™) or directly between two user devices (e.g., smartphones) or online (e.g., download or upload). In the case of the online distribution, at least some of the computer program products may be at least temporarily stored or provisionally generated in a machine-readable storage medium, such as the memory of the server of a manufacturer, the server of an app store or a relay server.

According to various embodiments, each (e.g., module or program) of the described elements may include a single entity or a plurality of entities, and some of a plurality of entities may be separately disposed in another element. According to various embodiments, one or more elements or operations of the aforementioned elements may be omitted or one or more other elements or operations may be added. Alternatively or additionally, a plurality of elements (e.g., modules or programs) may be integrated into a single element. In such a case, the integrated element may identically or similarly perform a function performed by a corresponding one of the plurality of elements before at least one function of the plurality of elements is integrated. According to various embodiments, operations performed by a module, a program or another element may be executed sequentially, in parallel, iteratively or heuristically, or one or more of the operations may be executed in different order or may be omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a speaker,
wherein the speaker comprises:
an enclosure comprising a first housing and a second housing,
a speaker driver included in the first housing, and
a mesh structure separating the first housing and the second housing,
wherein the second housing comprises:
an adsorption cavity forming a back volume of the speaker driver,
a variable structure included in at least a part of the second housing,
a hole for injecting an adsorptive filler into the adsorption cavity,
a plug combined with the hole and preventing the adsorptive filler from leaking, and
a housing cover coupled to the variable structure,
wherein the adsorption cavity is filled with the adsorptive filler,
wherein vibration of air is delivered to the adsorption cavity through the mesh structure,
wherein when the housing is coupled to the variable structure, a volume of the adsorption cavity is reduced, and
wherein the variable structure includes a flexible material.

2. The electronic device of claim 1,
wherein the second housing comprises an opening in at least a part thereof, and
wherein the variable structure covers the opening.

3. The electronic device of claim 1, wherein the variable structure comprises:
a support structure having at least a part combined with the second housing and having a flexible material; and
a plate structure having at least a part combined with the support structure and having a rigid material.

4. The electronic device of claim 1, wherein the variable structure comprises:
a support structure having at least a part combined with the second housing and having a compressible material; and
a plate structure having at least a part combined with the support structure and having a rigid material.

5. The electronic device of claim 1,
wherein the variable structure comprises:
a combination structure having at least a part combined with the second housing, and
a cover structure having at least a part combined with a support structure, and
wherein the combination structure and cover structure of the second housing are ejected in an all-in-one form.

6. The electronic device of claim 1,
wherein the variable structure comprises:
a combination structure having at least a part combined with the second housing, and
a cover structure having at least a part combined with a support structure, and
wherein the combination structure and the cover structure are ejected and fused by being separated from the second housing.

7. The electronic device of claim 1,
wherein the variable structure comprises:
a screw structure having at least a part combined with the second housing, and
a cover structure having at least a part combined with a support structure, and
wherein, when the screw structure is tightened, the cover structure is closely attached to the second housing.

8. The electronic device of claim 1,
wherein the variable structure comprises:
a hook structure having at least a part combined with the second housing, and
a cover structure having at least a part combined with a support structure, and
wherein, when pressure is applied to the hook structure, the cover structure is closely attached to the second housing.

9. The electronic device of claim 1,
wherein the variable structure comprises:
a thermoplastic support structure having at least a part combined with the second housing, and
a cover structure having at least a part combined with a support structure, and wherein, when the thermoplastic support structure is hardened after thermal processing, the cover structure is closely attached to the second housing.

10. The electronic device of claim 1, wherein the variable structure comprises:

an elastic support structure having at least a part combined with the second housing and having a silicon material, and a cover structure having at least a part combined with a support structure, and wherein, when a location of the elastic support structure is recovered by elasticity of the elastic support structure, the cover structure is closely attached to the second housing.

11. The electronic device of claim 2, further comprising a filling stopper corresponding to the opening.

12. The electronic device of claim 11, wherein the filling stopper comprises a trapping shape.

13. The electronic device of claim 1, wherein the variable structure comprises a fixed structure capable of being combined with the housing cover.

14. The electronic device of claim 1, wherein the adsorption cavity is changed from a first volume to a second volume when the housing cover is combined with the adsorption cavity, and wherein the first volume is greater than the second volume.

15. The electronic device of claim 1, wherein the second housing comprises:

an adsorptive filler inlet for injecting the adsorptive filler; and an inlet plug comprising a structure combined with the adsorptive filler inlet and reducing a volume of the adsorption cavity.

16. The electronic device of claim 1, wherein the hole is formed in the variable structure.

17. The electronic device of claim 1, wherein the second housing comprises a plurality of variable structures.

18. The electronic device of claim 1, wherein the speaker driver comprises a diaphragm, and a speaker surround, and wherein the speaker surround is formed in a bent shape.

* * * * *